United States Patent [19]

Glover et al.

[11] Patent Number: 4,564,945

[45] Date of Patent: Jan. 14, 1986

[54] ERROR-CORRECTION CODE FOR DIGITAL DATA ON VIDEO DISC

[75] Inventors: Neal Glover, Broomfield; Kermit Clausen, Boulder; Chris Mayne, Boulder; Randy Glissmann, Boulder, all of Colo.

[73] Assignee: Reference Technology, Inc., Boulder, Colo.

[21] Appl. No.: 505,210

[22] Filed: Jun. 20, 1983

[51] Int. Cl.[4] ............................................. G06F 11/10
[52] U.S. Cl. ....................................... 371/38; 358/336; 360/38.1; 371/40; 371/50
[58] Field of Search ........................ 371/38, 39, 40, 50; 358/336; 360/38.1

[56] References Cited

U.S. PATENT DOCUMENTS

| | | | |
|---|---|---|---|
| 3,200,374 | 8/1965 | Ballard | 371/50 |
| 4,052,698 | 10/1977 | Ragle | 371/38 |
| 4,277,844 | 7/1981 | Hancock et al. | 371/38 |
| 4,309,721 | 1/1982 | Christopher | 371/40 X |
| 4,336,612 | 6/1982 | Inoue et al. | 371/39 |
| 4,467,373 | 8/1984 | Taylor et al. | 360/38.1 |

OTHER PUBLICATIONS

D. C. Bossen et al., Bidirectional Error Correcting Codes, IBM Tech. Discl. Bulletin, vol. 20, No. 5, Oct. 1977, pp. 1853–1856.

*Primary Examiner*—Charles E. Atkinson
*Attorney, Agent, or Firm*—Townsend and Townsend

[57] ABSTRACT

Data for recordation on a video disc is given multi-redundancy at block, field and group levels. Raw data is filled typically serially row by indexed row of 8-bit words with at least one and preferably 3 words being auxiliary check words derived from the remainder of the data field of the block. Block filling is completed with the addition of preferred Reed/Solomon error-correction redundancy filling two rows for column error detection and correction and two columns for row error detection and correction. Thirty blocks, so prepared, are processed to obtain two redundant blocks, completing a 32-block data field. Writing the data onto the video disc occurs with a three-dimensional diagonal interleave at the field level. After interleave each field is additionally XORd with 62 other fields to create a redundant field. This redundant field plus the 63 data fields comprise a group. The group of fields is written to the video disk so as to maximally spatially separate adjacent fields. Recording occurs via an optical master disc. Stamped replications (video discs) are made from the master disc. Data from the video discs is decoded accordingly.

86 Claims, 24 Drawing Figures

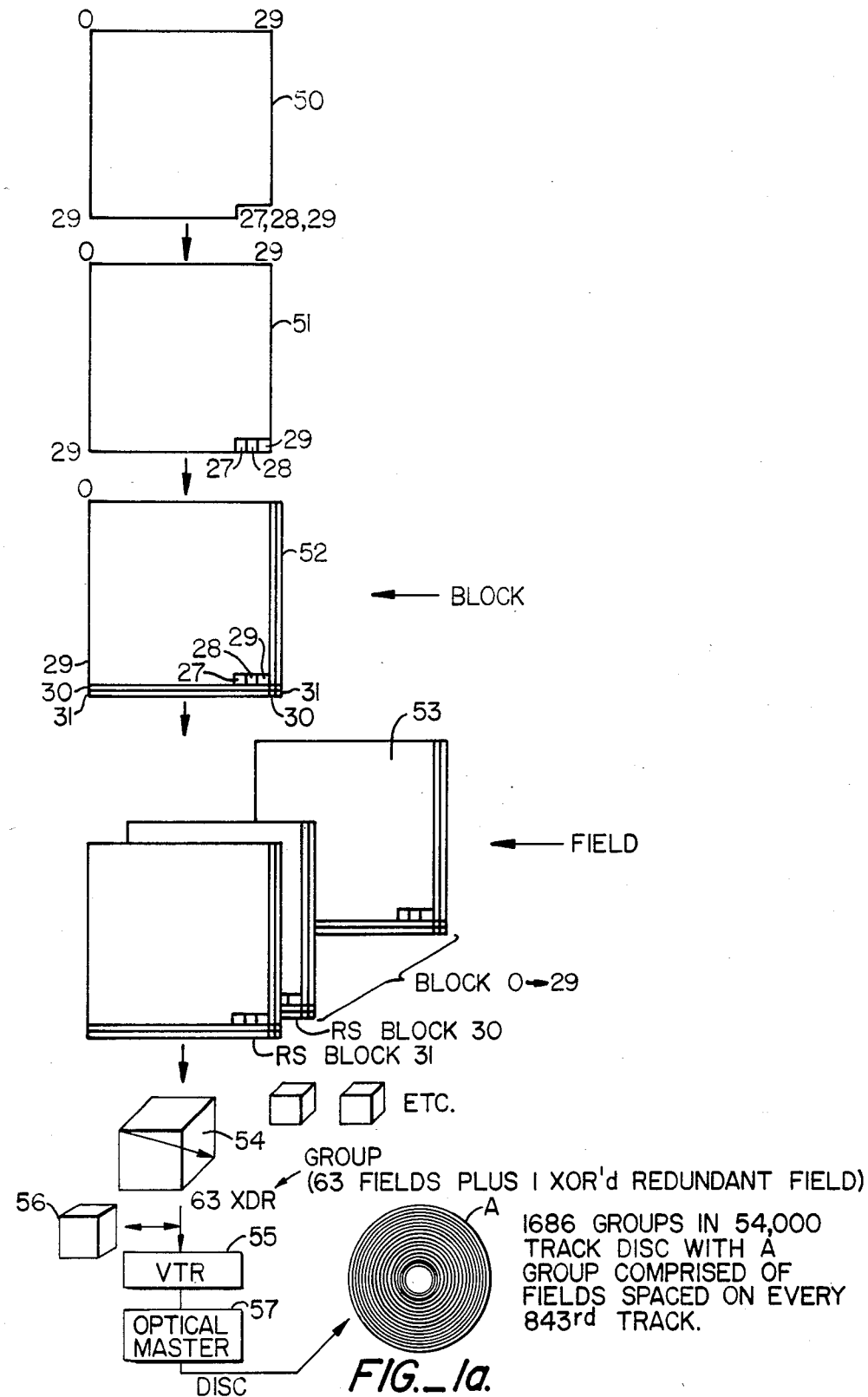
FIG._1a.

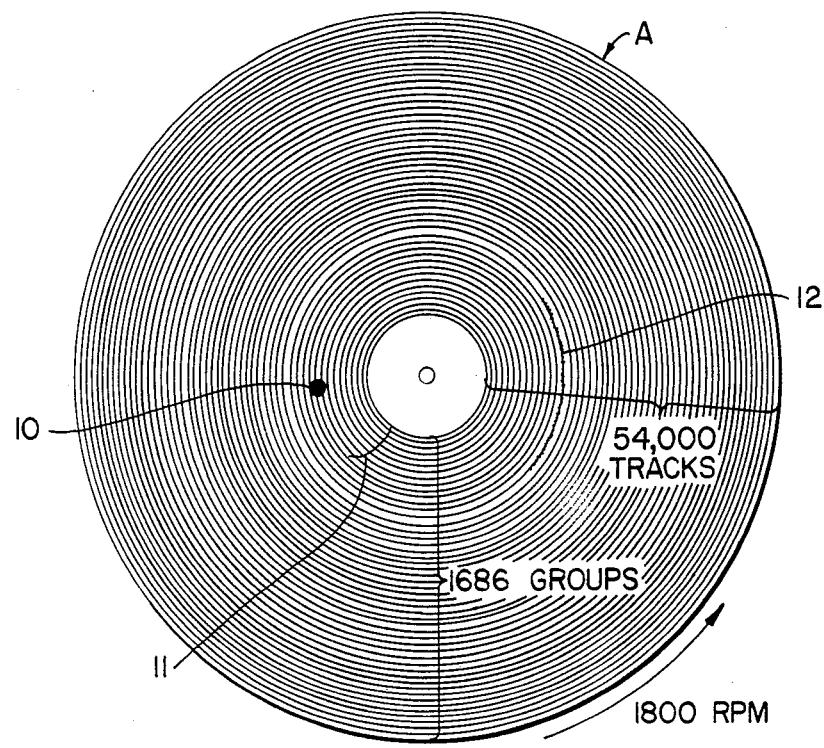
FIG._1b.
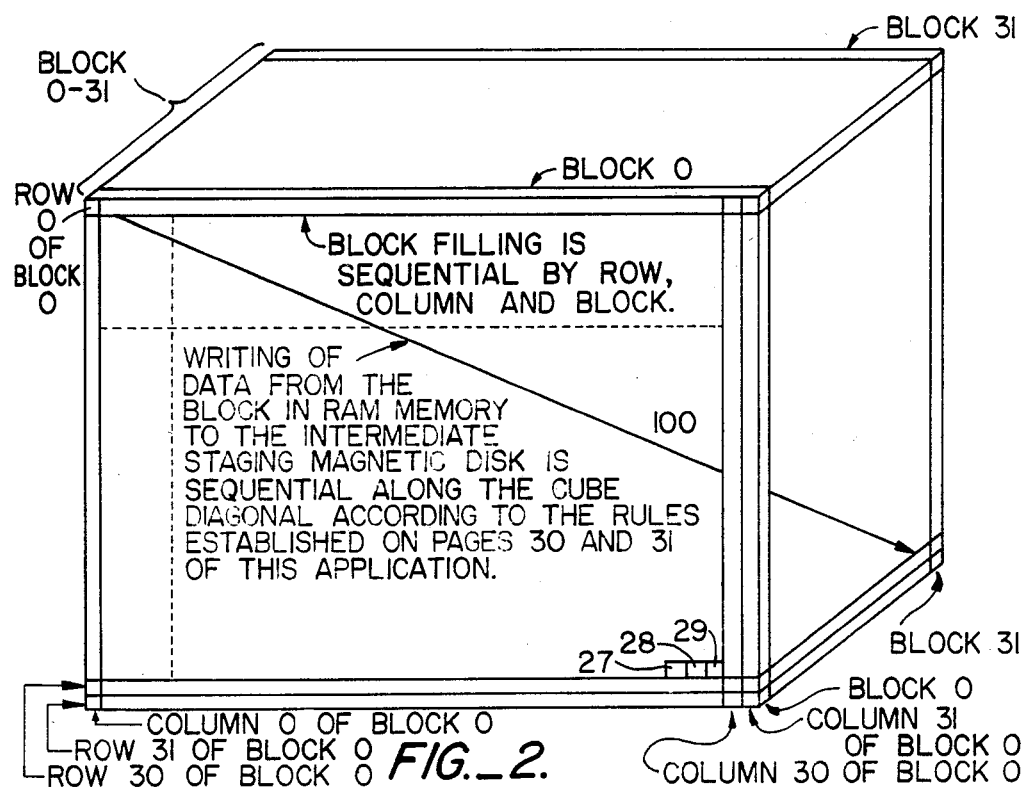
FIG._2.

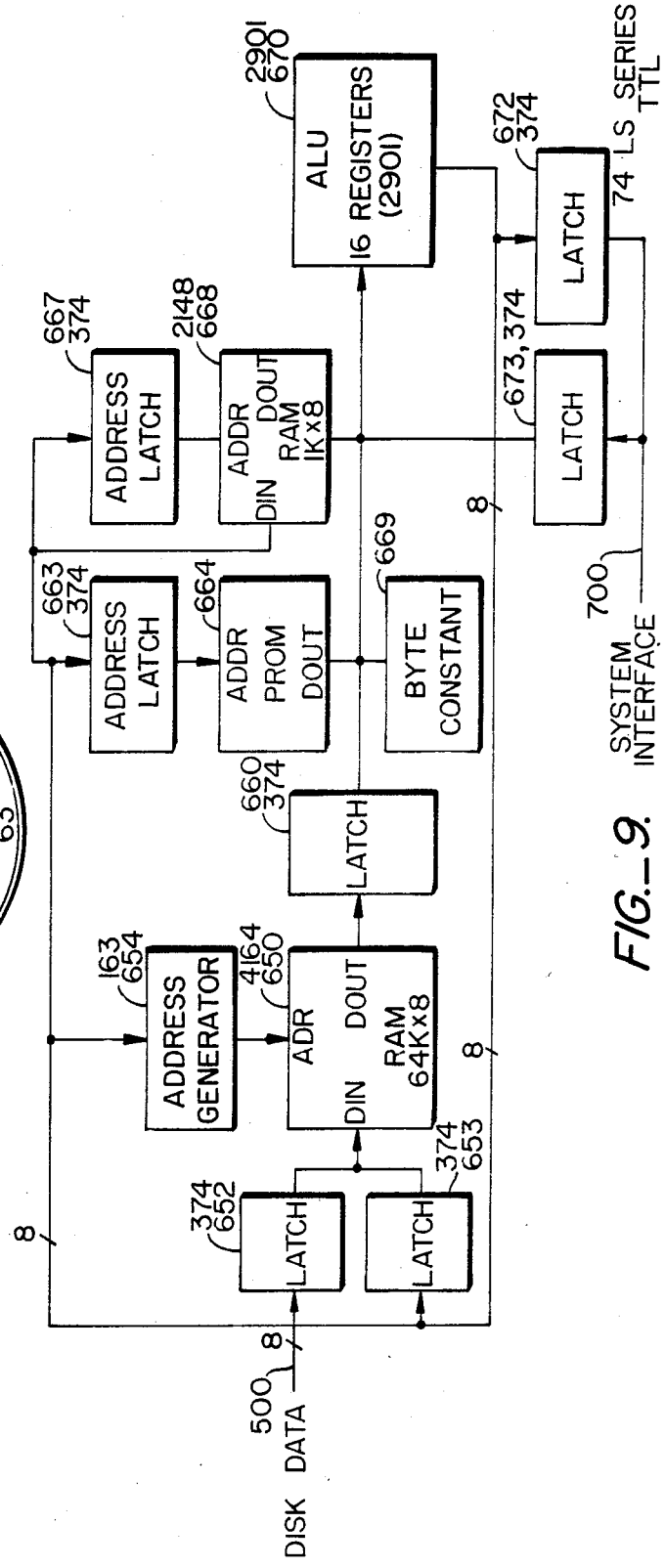
FIG.—1c.
FIG.—9.

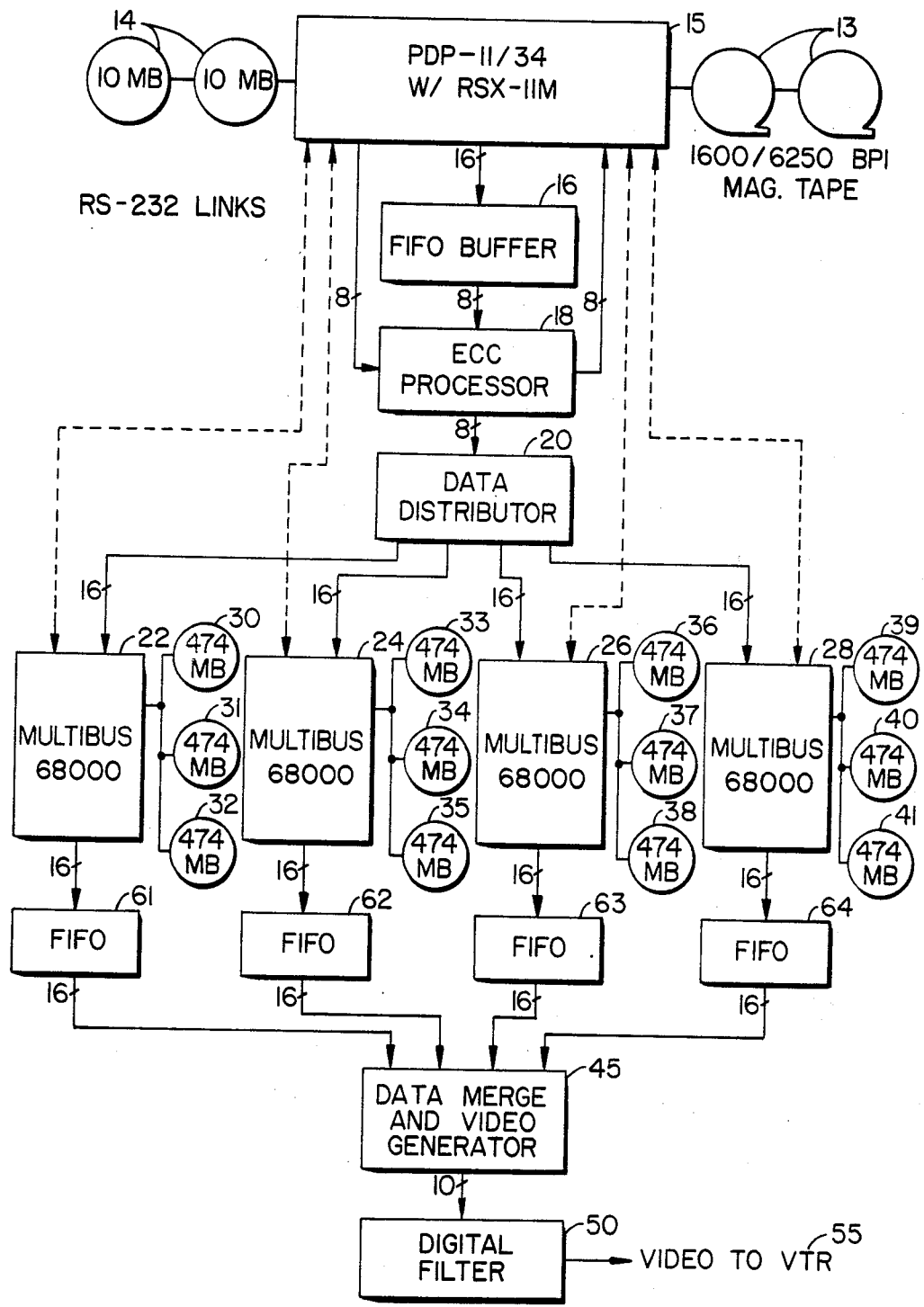
FIG._3A.

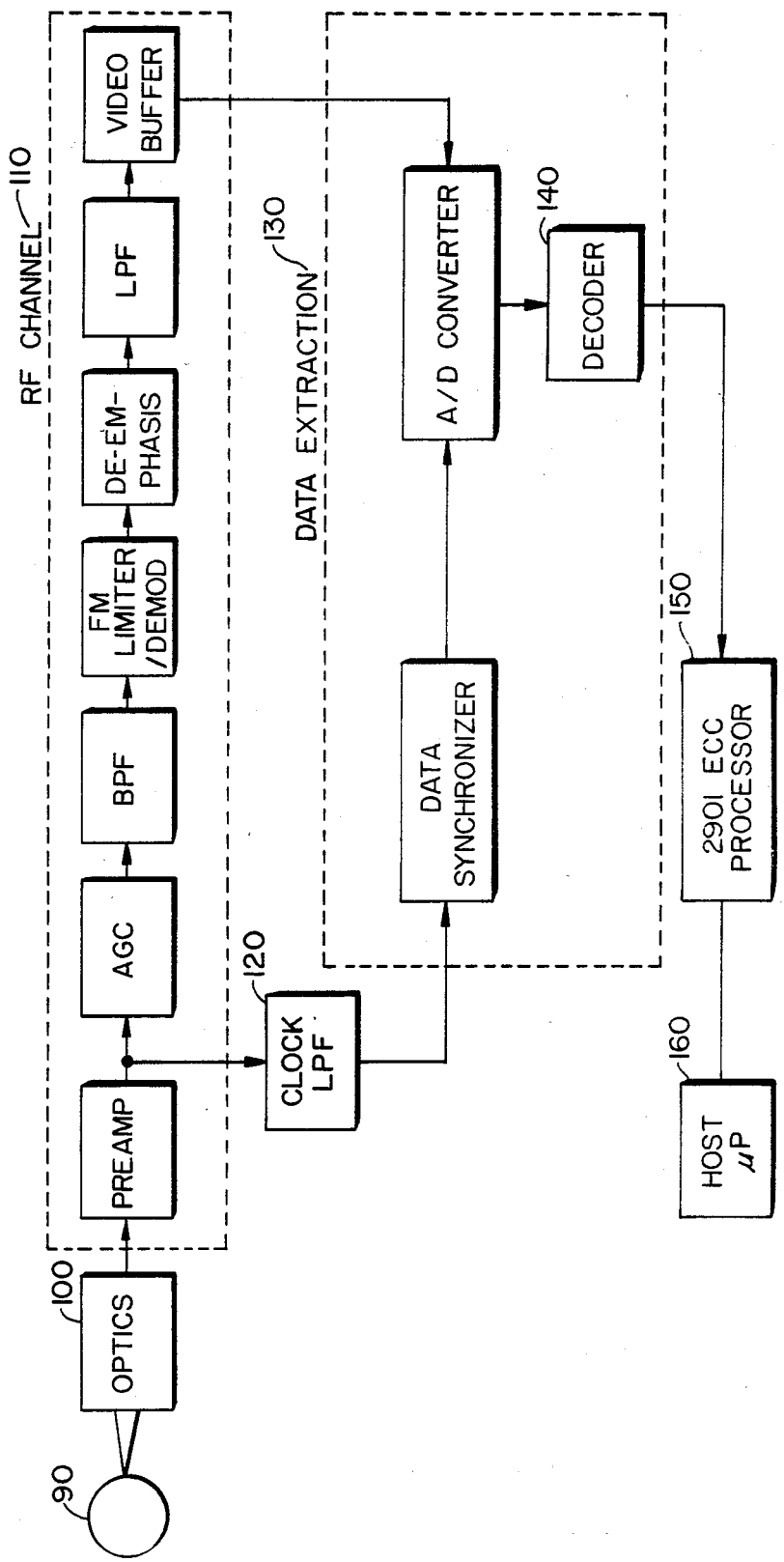
FIG._3B.

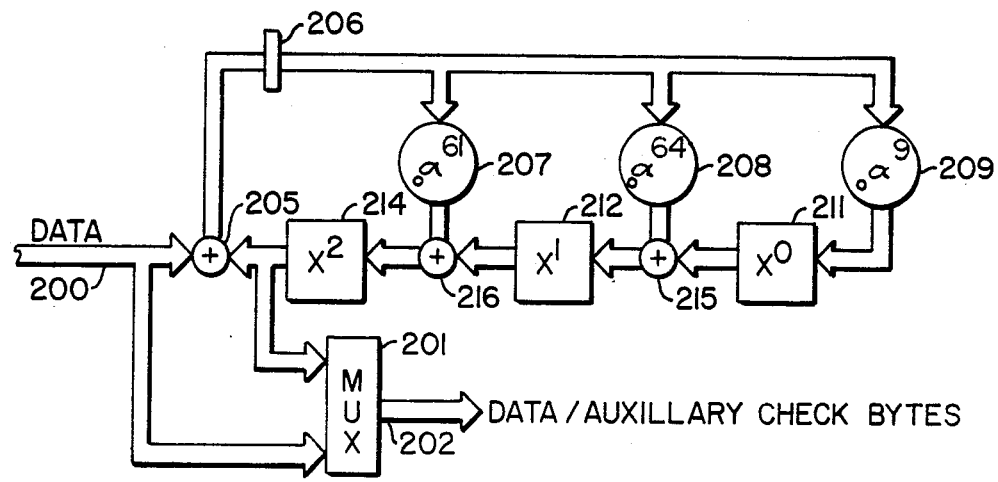
= GALOIS FIELD ADDER OVER GF($2^8$) {XOR ACROSS 8 BITS}
= CONSTANT MULTIPLIER OVER GF($2^8$).
= 8 BIT LATCH
FIG._4.
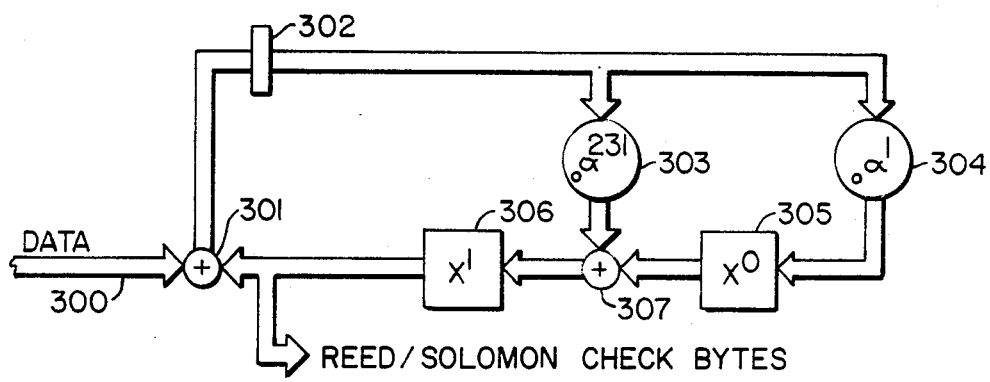
FIG._5.

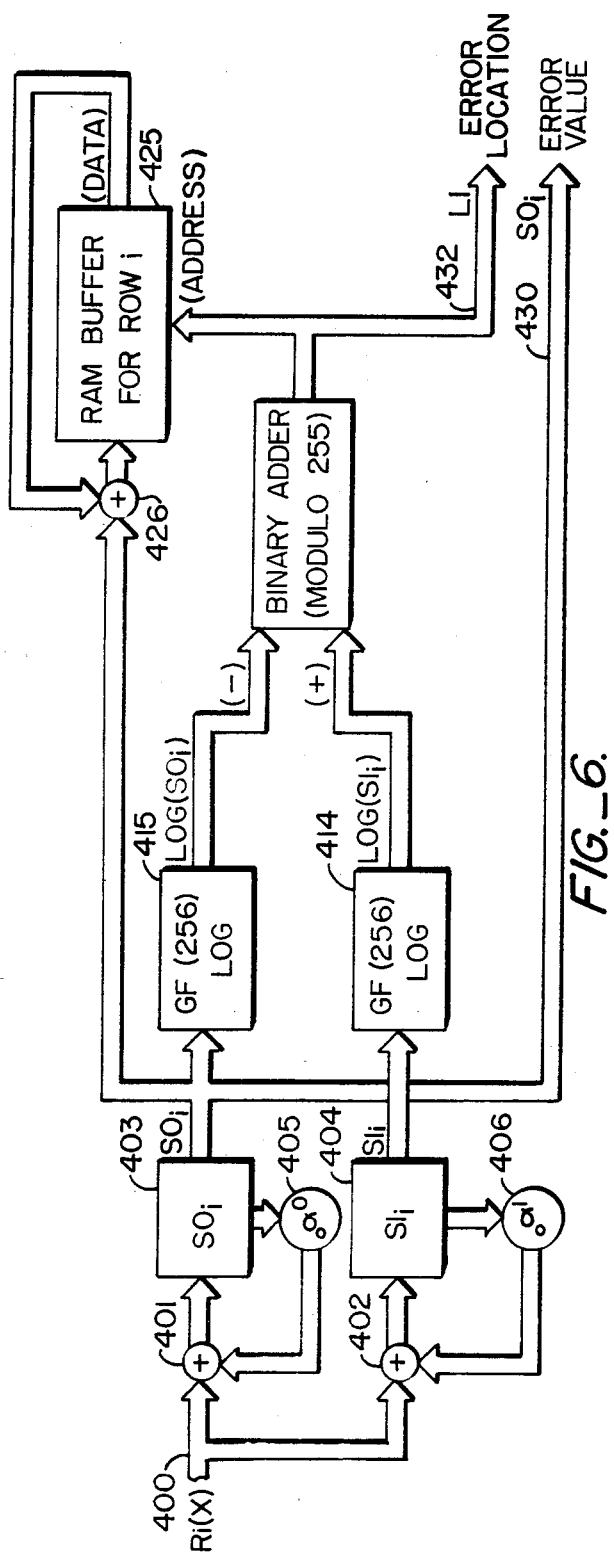
FIG._6.

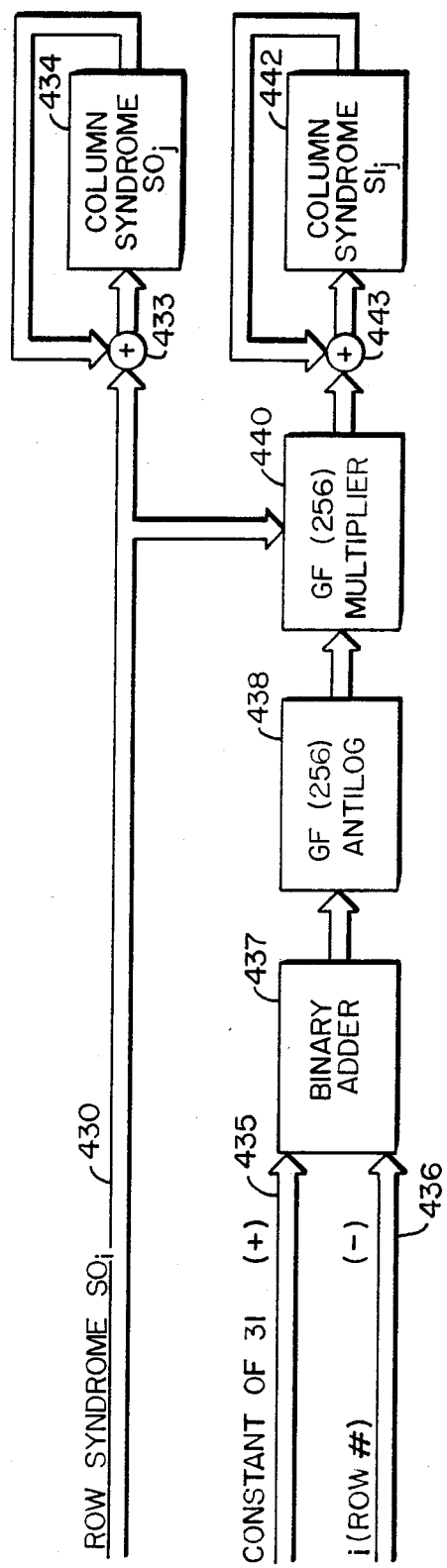
FIG._7.

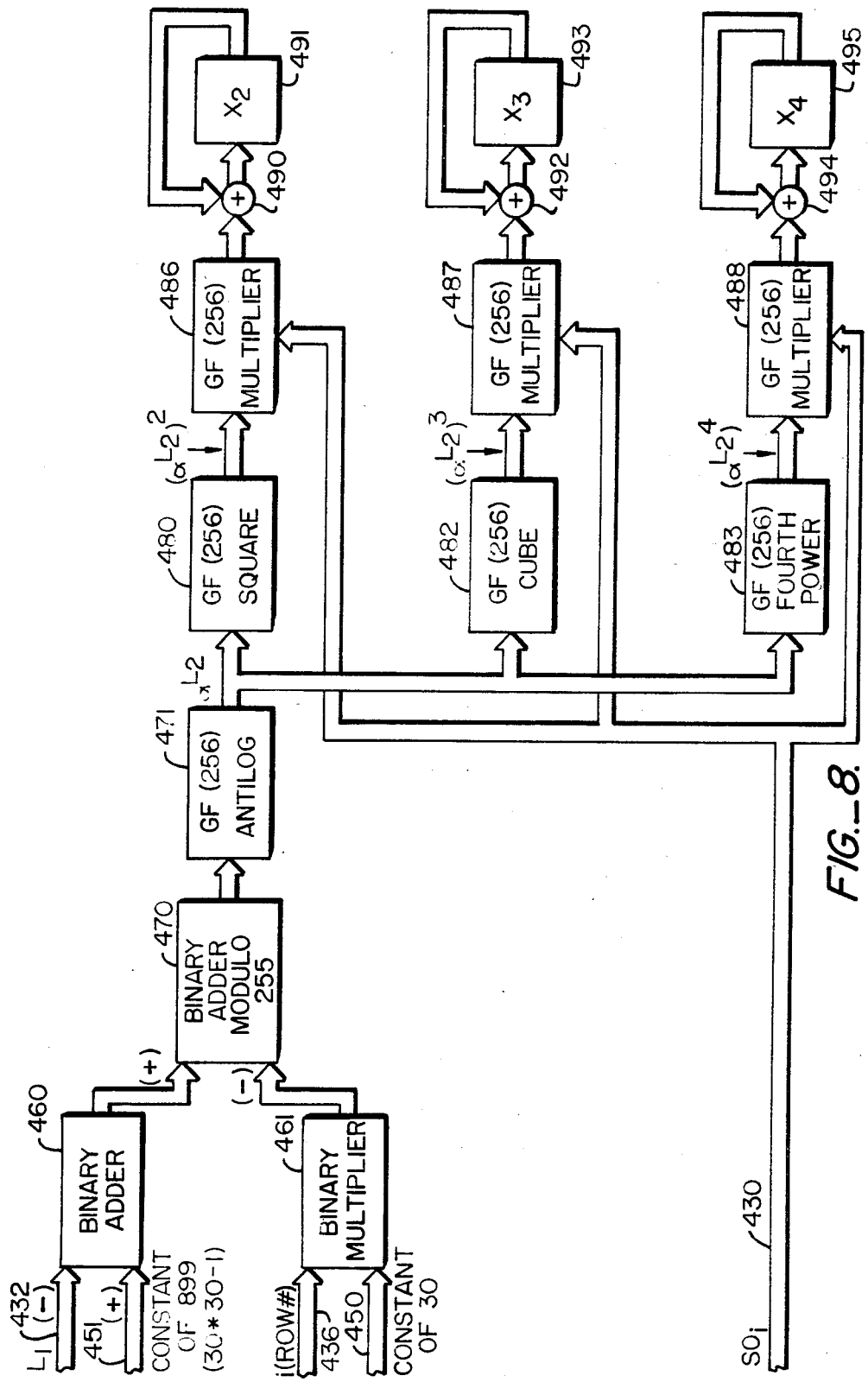
FIG._8.

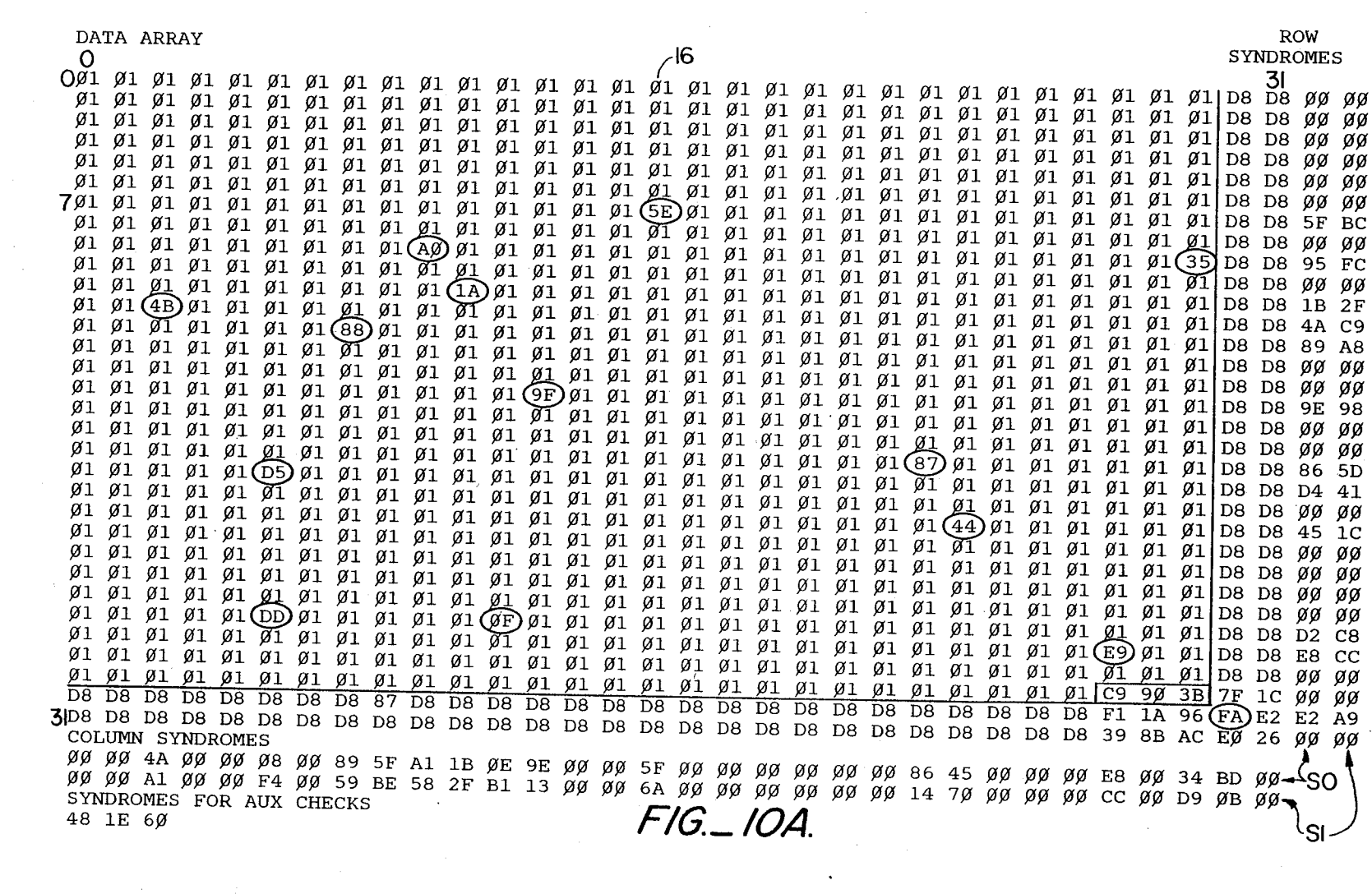

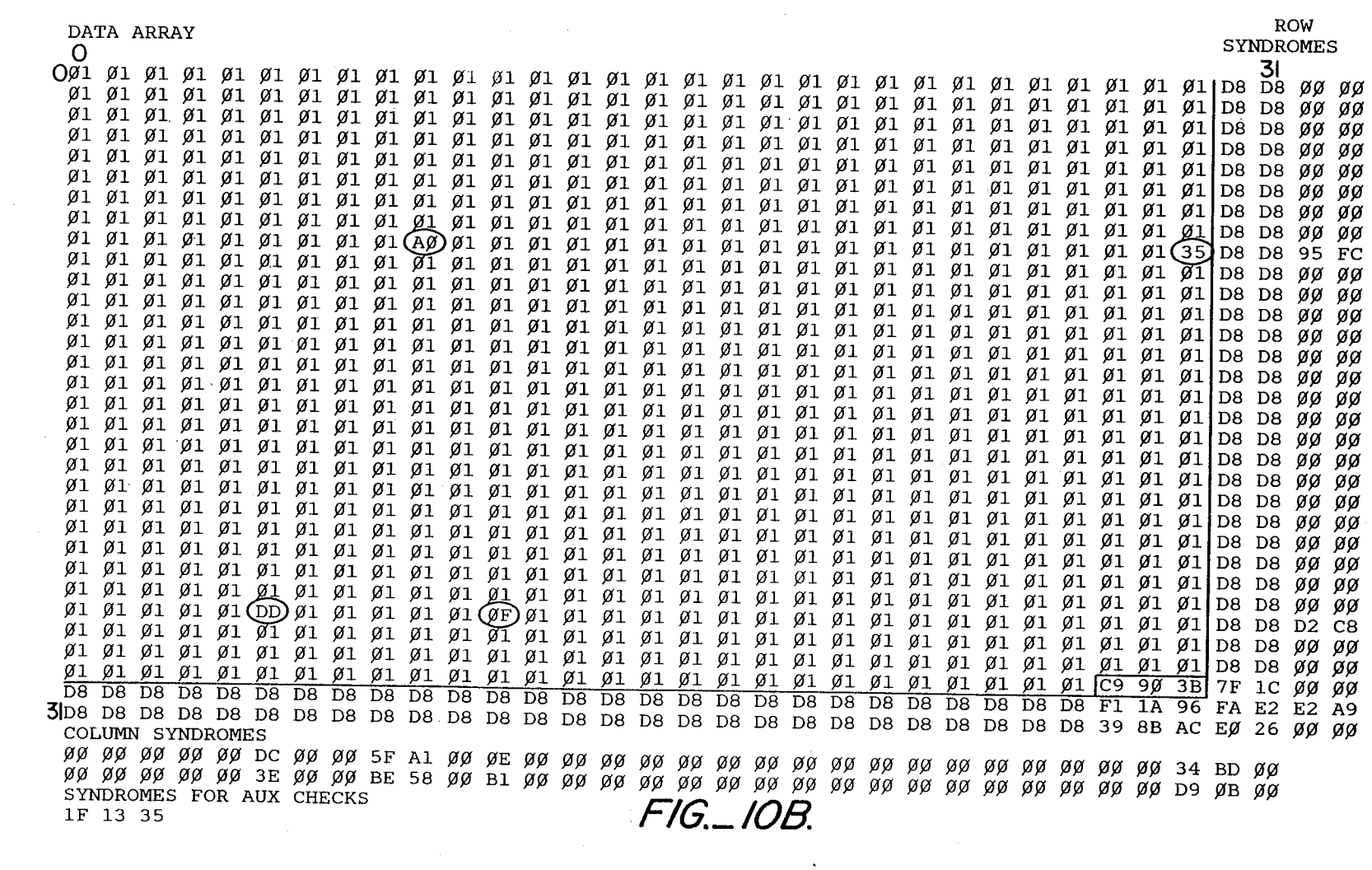

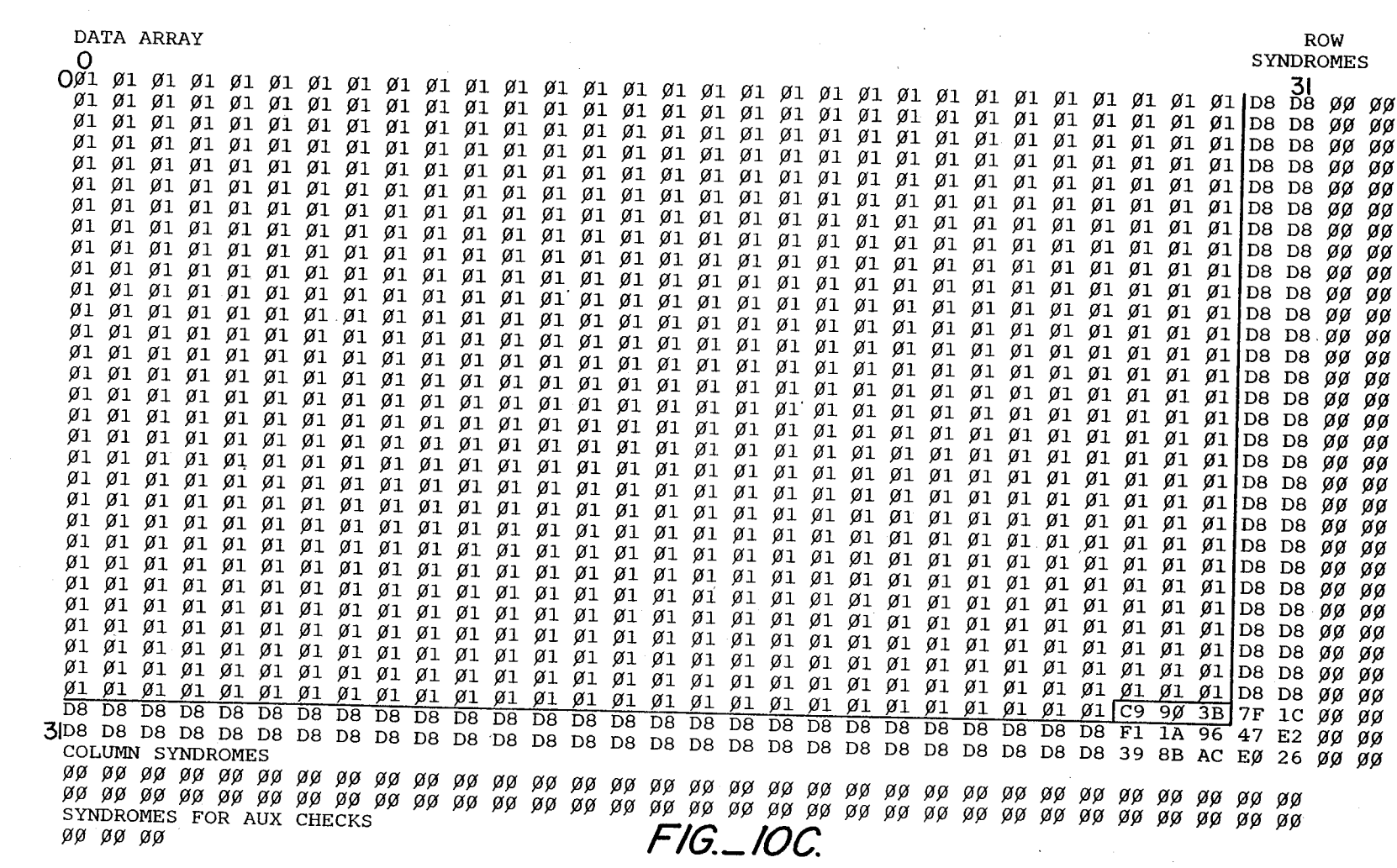

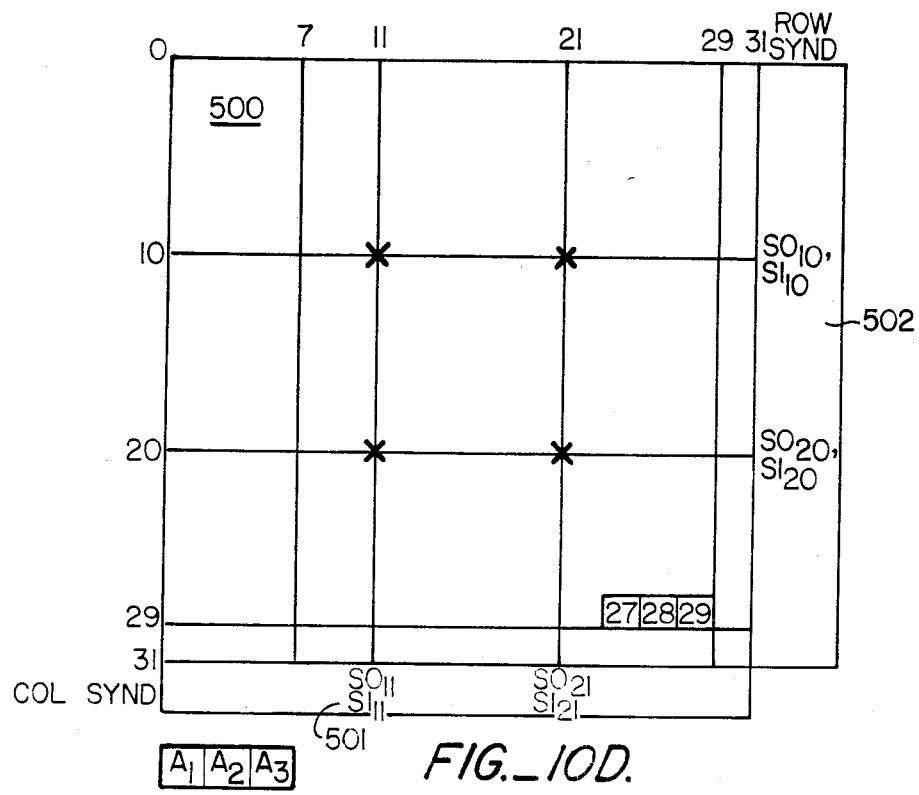
FIG._10D.
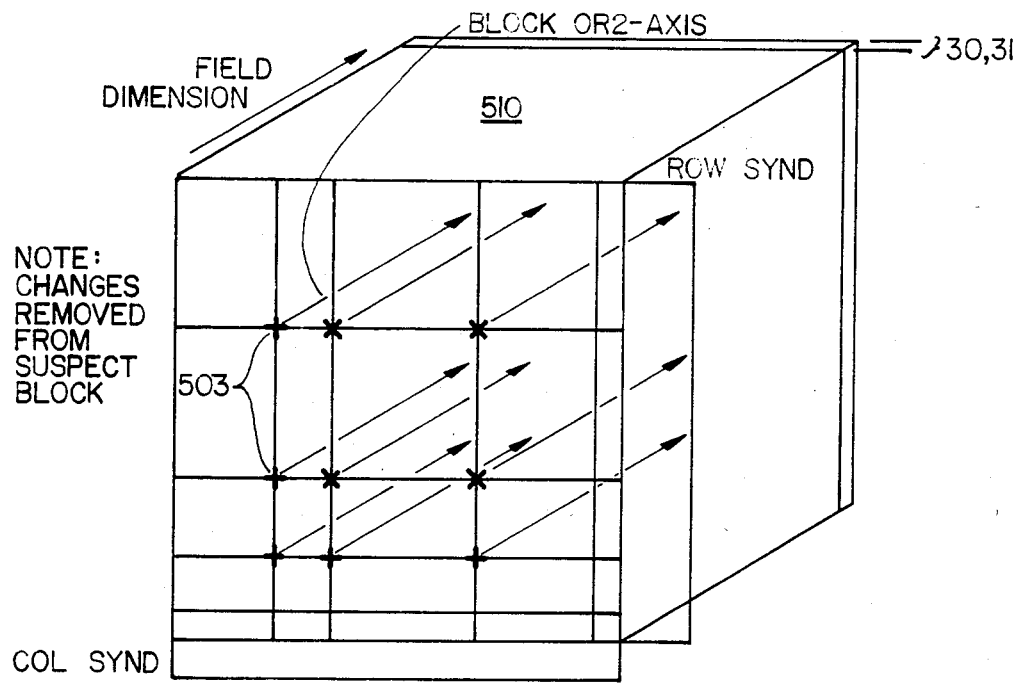
FIG._10E.
RETURN TO FIG. 10A.

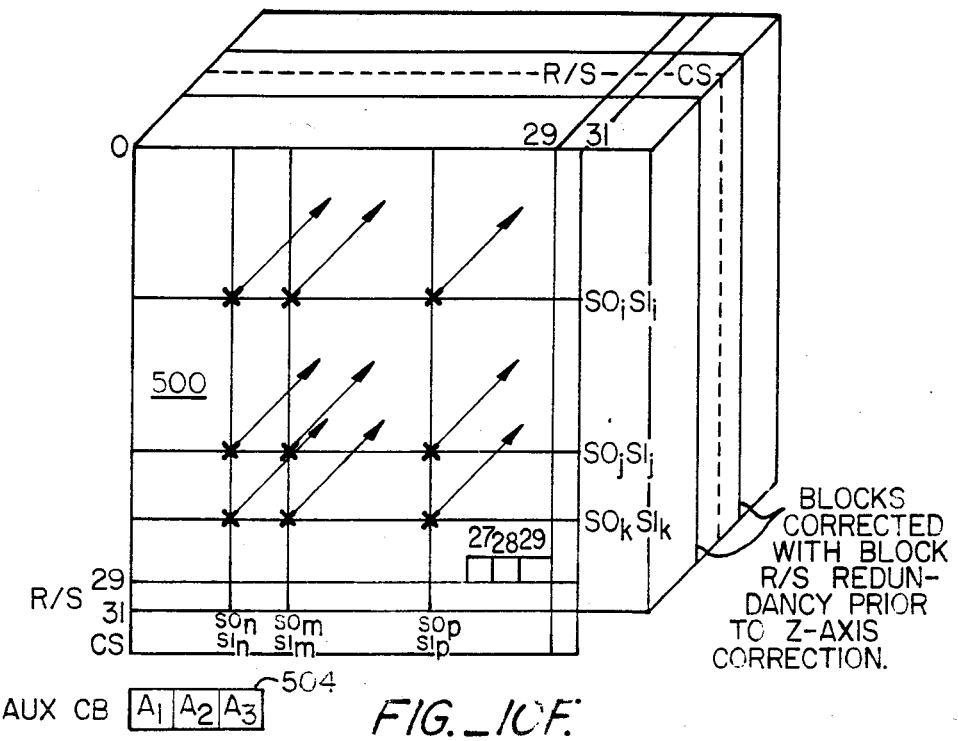
FIG._10F.
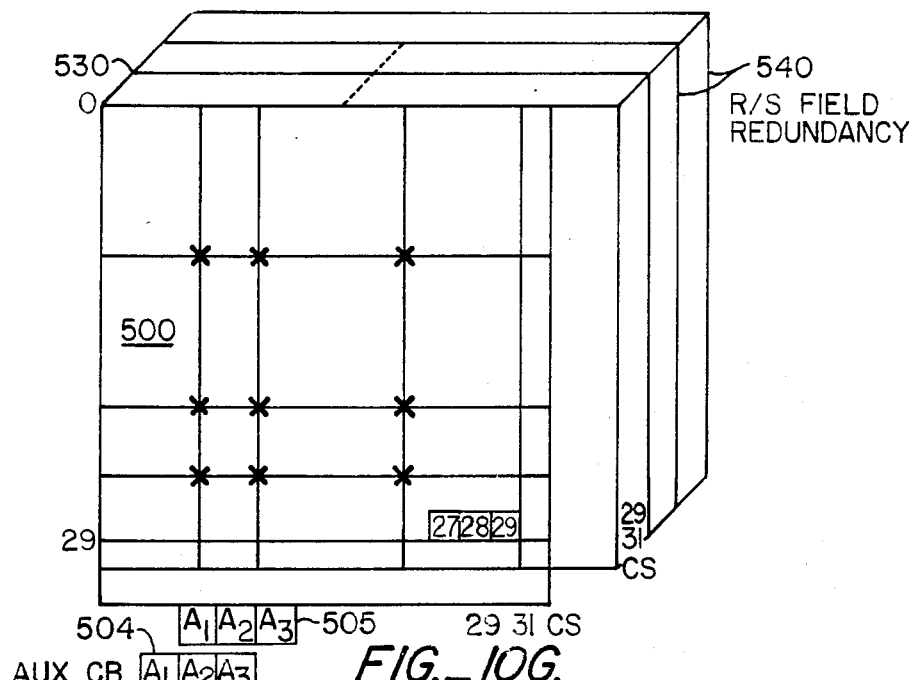
FIG._10G.
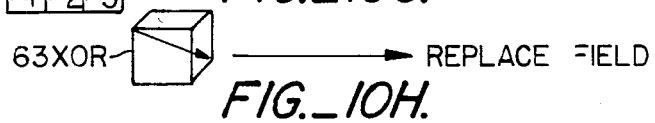
FIG._10H.

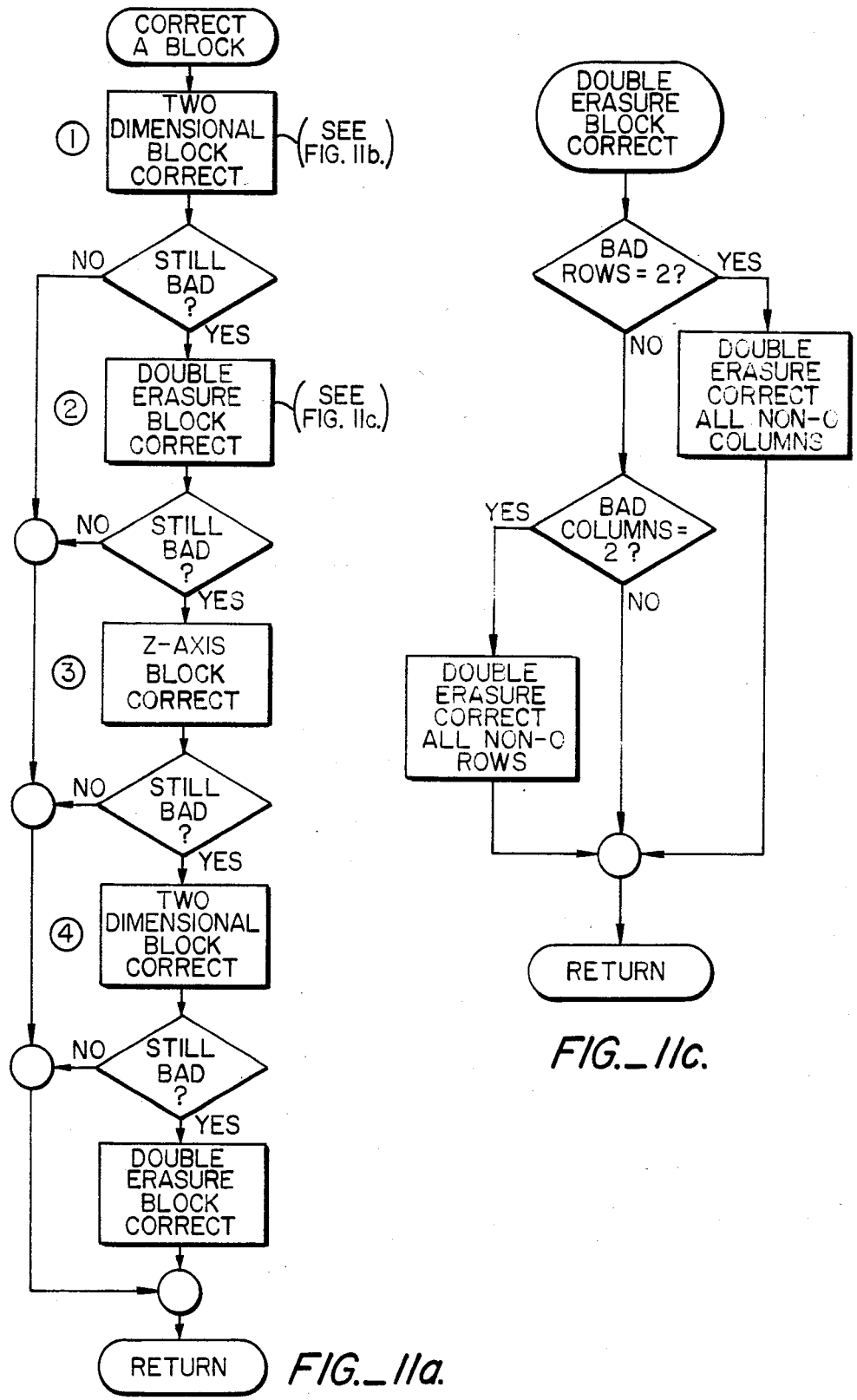
FIG._11a.
FIG._11c.

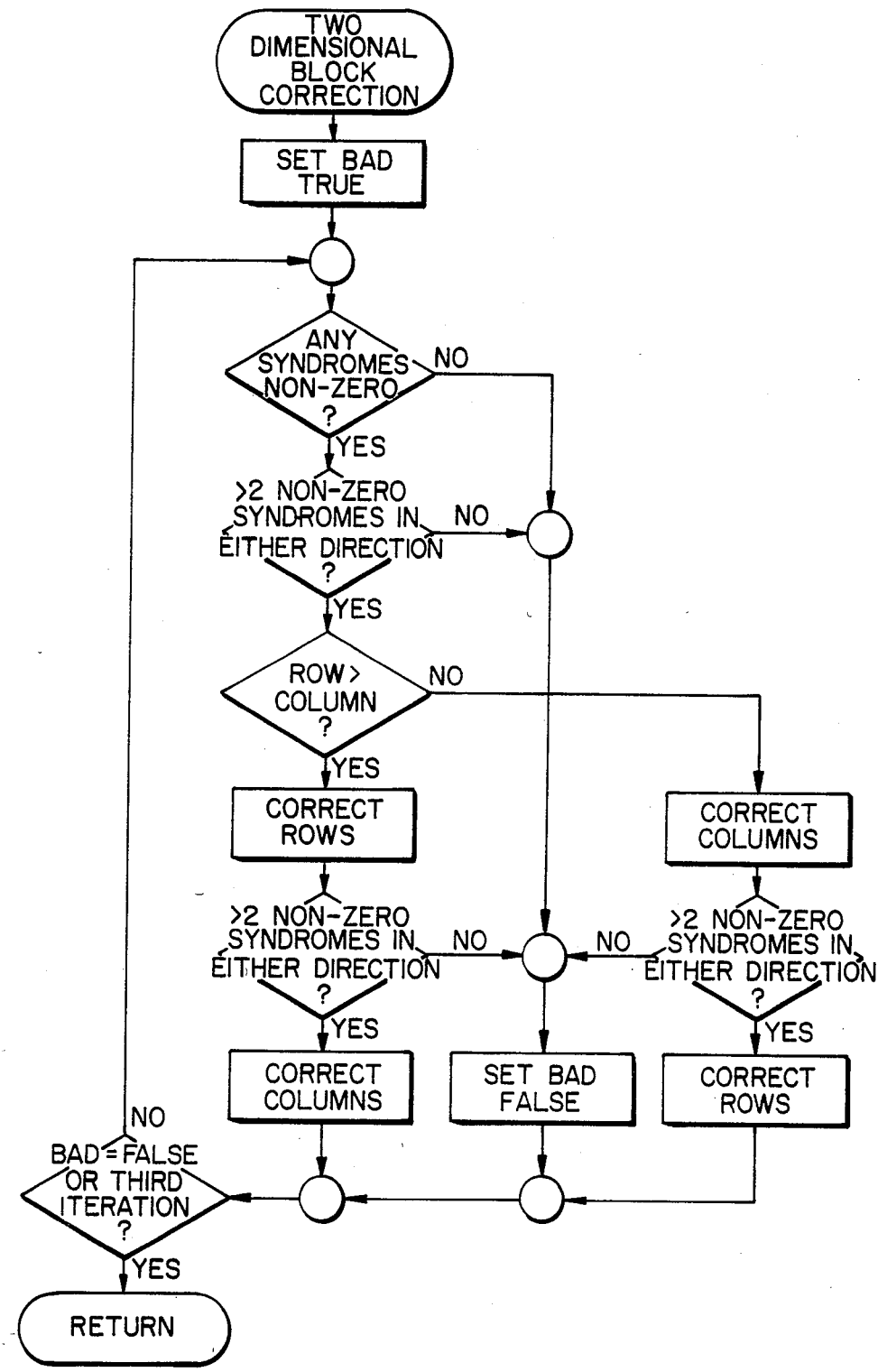
FIG._11b.

FIG._12 MICROWORD LAYOUT SHEET

| Field | Values |
|---|---|
| SEQUENCE (bits 44 43, 0-3) | 0 JZ, 1 CJS, 2 JMAP, 3 CJP, 4 PUSH, 5 JSRP, 6 CJV, 7 JRP, 8 RFCT, 9 RPCT, A CRTN, B CJPP, C LDCT, D LOOP, E CONT, F TWB |
| TEST (bits 40 39, 2) | 0 IBF, 1 OBF, 2 TRUE, 3 NALUZ, 4 ALUZ, 5 NCOUT, 6 COUT, 7 NIBF, 8 NOBF, 9 FLAG, A, B, C, D, E, F |
| ORDER (bits 36, 3) | 0 —, 1 RAMCTRCL, 2 RAMCNTEN, 3 LJUMP, 4 LDBLK, 5 LTOREN, 6 MEMRD, 7 MEMWRT, 8 LDROW, 9 LDCOL, A, B, C, D, E, F |
| ES EXTERNAL SOURCE (bits 35, 4) | 0 —, 1 VIDEOIN, 2 PROMRD, 3 RAMRD, 4 INTFIN, 5 BCONST, 6 MREGRD, 7 — |
| ED EXTERNAL DESTINATION (bits 32, 5) | 0 —, 1 MREGWRT, 2 RAMWRT, 3 TRAMADDR, 4 PRAMADDR, 5 BLKADDR, 6 INTFOUT, 7 RAMADDR, 8 RCADDR, 9, A, B, C, D, E, F |
| A INTERNAL (bits 28 25, 6) | 0→F |
| B INTERNAL (bits 24 21, 7) | 0→F |
| IS (bits 20 19, 8) | 0 AB, 1 ZB, 2 DA, 3 DZ |
| ALU (bits 18 17, 9) 2901 | 0 PLUS, 1 SMRMI, 2 RMSMI, 3 OR, 4 AND, 5 NAND, 6 EXOR, 7 EXNOR, 8 PLUS PI, 9 SMINR, A RMINS, B UNDER |
| C-I-N (9) | |
| ID INTERNAL DESTINATION (bits 15 14, 10) | 0 —, 1 NOD, 2 ED→A,B, 3 B, 4 —, 5 BLRS, 6, 7 BLLS |
| PROM ADDR / LATCH ORDERS (bits 12 11, 11) | LONG JUMP |
| CONSTANT / SHORT JUMP (bits 8 7, 12) | |
| LATCH ORDERS | 0 RST(AUTOINC), 1, 2, 3 RST(FLAG), 4 RST(COL), 5 RST(STB), 6 RST(ACK), 7 RST(BCEN), 8 SET(AUTOINC), 9, A, B SET(FLAG), C SET(COL), D SET(STB), E SET(ACK), F SET(BCEN) |

ERROR-CORRECTION CODE FOR DIGITAL DATA ON VIDEO DISC

A microfiche appendix with two microfiche and a total of sixty-eight frames is included as a part of this specification.

This invention relates to the storage of high density digital data on a replicated (i.e., nondirect-read-after-write) medium, and more particularly to the storage of binary data on an optical video disc in an analog television signal format. Specifically, this application discloses an error-correction design.

SUMMARY OF THE PRIOR ART

The prior art existent at the time of this invention is best summarized in the June 1982 *Byte Magazine* on page 142 in the article entitled "Video Disks and Optical Data Storage" by Moberg and Lasky. In this article, storage of data on a video disc is suggested. The authors clearly delimit the problems which the art faces. It is the intention of this disclosure to remedy these problems through the identification and quantization of errors introduced by the commercial video disc production process and the selection and test of error-correction designs for the purpose of maximizing usable data storage.

The reader will, therefore, understand that the statement of problems set forth constitute design constraints and are part of the invention herein. Other relevant prior art, primarily directed to audio reproduction, is extant. Most of the audio reproduction error-correction codes attempt only to reduce the number of errors. They do not conduct correction to the level required for the handling of archival digital data (for instance bank records, software, or text files).

A 16×16 data array utilizing a Reed/Solomon code is shown in the article "A Multi-Track Digital Audio Recorder for Consumer Applications" an Audio Engineering Society preprint presented at the 1981, Conference in New York (Oct. 30, through Nov. 2, 1981). Processing occurs with a row and column iteration. No further check is used. Concealment of any resultant audio defects is utilized thereafter.

Other relevant references relating to error correction of two-dimensional arrays may be found in Berding, U.S. Pat. No. 3,794,819; Doi, U.S. Pat. No. 4,306,305; Fletcher, U.S. Pat. No. 3,988,677; Kelly et al., U.S. Pat. No. 4,292,684; Iga et al., U.S. Pat. No. 4,238,852; Doi, U.S. Pat. No. 4,206,440; Kazami et al., U.S. Pat. No. 4,188,616; and Chen et al., U.S. Pat. No. 4,142,174.

With the exception of the Audio Engineering preprint, placement of redundancy codes for the location and thereafter correction of errors in a row and column format is not suggested. Further, the art fails to suggest penetration of the error-correction scheme beyond the first level of correction.

It is to be noted that many articles include coding for error-correction in columns and rows. However, in most cases dimension is used for error location only. Data regeneration is left to the other dimension.

STATEMENT OF THE PROBLEM

This invention discloses an error-correction design which has application to digital data storage on a video disc. A standard NTSC constant angular velocity (CAV) video disc is utilized having 54,000 tracks per disc with each track containing a television frame, or two television fields. A frame contains 525 television lines, 262.5 lines per field. The rotational speed of the video disc is 1800 RPM. Duration of a frame is 33.3 milliseconds yielding 30 frames per second. Duration of a line is approximately 63 microseconds.

Digital data stored on the video disc is organized into data blocks, data fields and data groups. A data block is a two-dimensional array with 32 rows and 32 columns of 8-bit bytes. A data field is a three-dimensional array containing 32 data blocks. A data field is physically contained in a field of NTSC television. A group is comprised of 64 fields.

Digital data to be stored on video disc is first written to an intermediate video tape. The video tape is then used in a laser mastering process to generate a master disc. Production video discs are stamped or molded from this master.

Errors are introduced by the intermediate video tape, the master disc, and the replicated video disc. The dominant source of errors is the replication process (especially the molding and metallization steps) which can produce blemishes of the disc optical surface up to 1 mm in diameter where no signal can be recovered, as well as much larger areas where increased noise or signal distortion may be introduced. When circumferentially read back by the disc drive laser system, the blemishes are transformed into long signal dropouts yielding a continuous burst of errors. Noise and signal distortion translate into a higher incidence of random byte errors upon read back. The average number of dropouts and random byte errors is well characterized but the precise positioning varies from replicated disc to replicated disc. The long dropouts present a special problem. Since the media is stamped, those areas containing long dropouts cannot be retired when data is placed on the media as is done with magnetic media (e.g., floppy and Winchester fixed disc technology) and other forms of optical media (e.g., DRAW).

This invention uses a form of interleaving to overcome the long dropouts by dispersing them into small increments over a large amount of data. In overcoming the error characteristics of digital data storage on video disc, this invention takes advantage of the uniqueness of data storage on this media. Premastering (i.e., the translation of digital data onto a video tape as a precursor to the laser mastering process) can be complex and slower than real time since it is performed once per unique master from which may emanate 10,000 or more copies.

DESIGN CONSTRAINTS

In our disclosure we provide for the organization of digital data into units compatible with an analog color television signal format and add a powerful and necessary error detection and correction code. Coworkers have developed the technique of digital to analog (video) encoding for successive recordation onto a video tape, an optical master for video disc generation, and finally the video discs themselves, produced by stamping or molding.

Because of the media contemplated herein, data is placed on video disc by a stamping or molding process and there will be no read verification following stamping or molding. Thus, from the recordation of the video tape, data is irrevocably dedicated to a particular physical position on the video discs. Nevertheless, I disclose an error-correction system which is so effective that only one disc out of 100 is expected to have errors that require the highest level of error-correction decoding herein disclosed (group level decoding).

The error-correction scheme of this disclosure was developed to handle random byte errors as well as dropout errors. Random errors are expected to occur at an average rate of up to $10^{-2}$ byte errors/byte and arise primarily from noise and distortion associated with the recovered signal. Both the disc surface and the laser/recovery electronics contribute to random errors.

Dropout errors are expected to pose the most serious problem. These errors are expected to occur at an average of 6 events per frame and to yield an average rate of $5 \times 10^{-4}$ byte errors/byte. However, because of their potential length and continuous nature, dropouts provide a significant error-correction obstacle in any serial data scheme. The maximum dropout length is expected to be on the order of 80 consecutive bytes, however the error-correction code is designed to rapidly and reliably recover data from dropouts in excess of 1000 bytes duration. The dropout distribution for as-manufactured video discs has been determined by statistically significant measurement and for the error-correction design is assumed to be:

| Dropout Length In Bytes | # Dropouts In 1000 Frames |
| --- | --- |
| 1 | 150 |
| 2 | 125 |
| 3 | 1500 |
| 4 | 4000 |
| 5 | 350 |
| 6 | 150 |
| 7 | 36 |
| 8 | 29 |
| 9 | 40 |
| 10 | 20 |
| 11 | 20 |
| 12 | 20 |
| 13 | 40 |
| 14 | 15 |
| 15 | 11 |
| 16 | 9 |
| 17 | 7 |
| 18 | 2 |

Long dropout errors from the disc appear as single byte errors in the playback circuitry RAM as a result of being spread throughout a data field by the three-dimensional diagonalizing interleave format which we hereinafter disclose.

The reader will note that the error-correction complexity is weighted towards the writing or premastering phase, which occurs only once for each unique collection of data on a video disc. Specifically, it is weighted to that portion of the system which adds error-correction redundancy and buffers the data on fixed disc drives until the entire disc content is ready for transmissions to a VTR at a high sustained data rate of approximately 2 megabytes/second. Premastering (transcription of digital data from magnetic tape to video tape with the addition of the error-correction code) for a three-gigabyte disc is expected to require about four hours. Since the data transfer rate to the intermediate video tape is very high all computation of error-correction redundancy must be completed before direct transfer begins.

SUMMARY OF THE INVENTION

Mastering of Video Discs

Data for recordation on a video disc has redundancy appended at block, field, and group levels. Raw data is first organized into data blocks of 900 bytes, 30 rows (0–29) by 30 columns (0–29). At least one and preferably three of the 900 data bytes are auxiliary check bytes derived from the remaining data bytes. Next, two Reed/Solomon redundancy bytes are added to each row to form columns 30 and 31. Then two Reed/Solomon redundancy bytes are added to each column to form rows 30 and 31. Thirty data blocks, so prepared, are processed according to the Reed/Solomon algorithm to obtain two redundancy blocks, which completes a 32 block data field. The completed data field contains Reed/Solomon single-error-correcting code words in the row, column and block dimensions.

Fields are written to the intermediate video tape in a three dimensional diagonal interleave format. The first byte of the data field to be written is taken from row 0, Column 0 and block 0. The second byte is taken from row 1, column 1 of block 1. Row, column and block addresses are each incremented by one after each byte is written. Incrementing a row, column or block address of 31 returns it to zero. Incrementing of the column address register is supposed if the row address register contains 31 at the time of its increment. Following address register incrementing, the block address register contents are tested for '0' or '1'. If the contents are '1' then the row and column address registers are saved in backup registers. These registers are restored to the row and column address registers if the contents of the block address register are '0'. This particular method of three dimensional diagonal interleaving has the advantage that it is easy to change the number of blocks in a field.

The highest level of redundancy generated is at the group level after the diagonal interleave format. Each group contains 63 data fields and one redundancy field. The redundancy field is generated by XORing the 63 data fields. Groups are organized to provide maximal physical separation between fields of a group on the video disc surface. Consistent with other disc formatting considerations, this separation may be up to 1686 tracks or approximately 2.8 mm. This dimension determines the largest disc surface blemish that can be tolerated without sacrifice of data integrity.

READING OF VIDEO DISCS

On reading from the disc, an entire field is disinterleaved using specialized hardware while the data is enroute to a semiconductor RAM memory. Disinterleaving reassembles the data using the inverse of the three dimensional diagonal addressing scheme that is used in the mastering of video discs. Once the data is reassembled, error detection proceeds as a separate hardware function utilizing the computation of syndromes from the data bytes, Reed/Soloman check bytes, and auxiliary check bytes on a single block at a time from RAM memory. After syndrome generation, nonzero row, column or auxiliary check syndromes indicate one or more bytes in error within the data block. In this case, block level decoding is performed.

Block Level Decoding (Phase 1)

The error-correction design of this invention allows an individual data block to be decoded with high probability, without having to decode adjacent data blocks. The central function of block level decoding is the Reed/Solomon single-error-correction algorithm which is performed on each row and each column (row/column decoding). Decoding starts in the dimension with the most nonzero syndromes. If all row, column and auxiliary check syndromes are zero after row/column decoding, the decoding is complete and the data part of the block is accurate with a very high probability and can be released to the requester.

Remaining nonzero syndromes indicate that the data block still contains one or more byte errors. In this case, row/column decoding is iterated.

At any time during this row and column iteration, if after row or column decoding there are precisely two rows and two or less columns with nonzero syndromes, or precisely two columns and two or less rows with nonzero syndromes, then the Reed/Solomon two-erasure algorithm is performed. If successful decoding results then decoding is complete; if successful decoding does not result, then phase 2 of block level decoding is initiated.

If the case of precisely two rows and two or less columns with nonzero syndromes, or precisely two columns and two or less rows with nonzero syndromes is not found, iteration continues until either successful decoding occurs or the total number of iterations reaches three.

If successful decoding has not been achieved after the third row/column decoding iteration, and if only two rows or two columns with nonzero syndroms remain, the Reed/Solomon two-erasure correction algorithm is performed.

If this two-erasure correction algorithm does not result in successful decoding, all changes to the data block are removed, the original block of data is restored, and phase 2 of block level decoding is initiated. Phase 2 of block level decoding is also initiated if after the third iteration there are more than two rows and more than two columns with nonzero syndromes.

Block Level Decoding (Phase 2)

In phase 2 of block level decoding, Reed/Solomon code words in the data block dimension are utilized to aid correction of a data block unsuccessfully decoded by phase 1. For each intersection of a row and column with nonzero syndromes in such a data block, syndromes are computed along the orthogonal vector in the block dimension defined by that intersection position. These syndromes are then decoded to obtain an error value and location. A correction is made if the location corresponds to the block in error.

After processing all such intersections, phase 1 of block level decoding is again performed. If successful decoding does not result, then phase 1 of field level decoding is initiated.

Field Level Decoding (Phase 1)

The first step of phase 1 field level decoding is to perform phase 1 of block level decoding on all blocks of the field. This will usually leave one or more blocks unsuccessfully decoded, since field level decoding is initiated as a result of an uncorrectable block.

The next step is to perform phase 2 of block level decoding on each block of the field that has not yet been successfully decoded. This process is iterated up to three times. If after three iterations, only one or two blocks remain unsuccessfully decoded, phase 2 of field level decoding is initiated. If there are more than two blocks not yet successfully decoded, phase 3 of field level decoding is initiated.

Field Level Decoding (Phase 2)

Phase 2 of field level decoding uses Reed/Solomon code words in the blocks dimension to correct one or two entire blocks. The Reed/Solomon single-erasure correction algorithm is used for correcting a single block. The Reed/Solomon two-erasure algorithm is used for correcting two blocks.

Field Level Decoding (Phase 3)

For phase 3 of field level decoding, the field is reread some number of times (preferably 3) and after each reread, correction is again attempted using block and field (phase 1 and 2) level decoding. If decoding of the field is still unsuccessful after all reread attempts, group level decoding is initiated.

Enhancements can be made to this level of decoding. First, the reread can be made selective. When the field is reread only those blocks that have not been successfully decoded will receive data from the reread. Second, majority voting is applied when rereading. The field is reread some odd number of times and a majority vote taken on each byte or each bit from all reads.

Group Level Decoding

Group level correction uses the Reed/Solomon single-erasure correction algorithm to correct a single erroneous field of a group. All fields of the group, other than the erroneous field, are XOR summed to regenerate the erroneous field. Each field is entirely error corrected by applying block and field level decoding as necessary before it is XORd to the sum.

OTHER OBJECTS, FEATURES AND ADVANTAGES OF THIS INVENTION

An object of the invention disclosed is to create an error-correction protocol which is weighted in complexity on the write and encoding side. According to this aspect of the invention, data is written to a 30×30 byte data area or two-dimensional array (called a block), this data area containing at least one and preferably three auxiliary check bytes for verifying the overcall field. Thereafter, writing of row redundancy data occurs at paired check columns and writing of column redundancy data occurs at paired check rows to complete a two-dimensional error detection and correction capability.

An advantage of this aspect of the invention is that the combination of the auxiliary check bytes and the Reed/Solomon code permits data verification or alternatively the location and correction of errors in the data to a high degree of accuracy.

A second object of the invention disclosed is to create a three-dimensional array format (called a field) having an integral error-correction redundancy format. According to this aspect of the invention, a three-dimensional array includes three orthogonal planes of Reed/-Solomon or alternative redundancy encoding. Any individual byte error in the data field can be located and corrected from three independent directions with error-correction redundancy; a group of errors distributed through a data field can be sequentially reduced in number to zero through interactive approach along the three-dimensions.

An advantage of the three-dimensional encoding herein disclosed is that the depth of error-correction protection enabled exceeds that possible with two-dimensional arrays by a wide margin.

Yet another advantage of the three-dimensional error-correction encoding herein disclosed is the capability of the protocol to be run at extremely high speeds on a dedicated microprocessor. Rates in the range of 2 million bytes per second can be decoded.

Another object of the invention disclosed is to create a method of distributing error, especially long error bursts of the serial type. According to this aspect of the invention, data is provided with redundancy information on a row and column format. Preferably data is organized serially row after row until all columns of a block or two-dimensional array are filled. Redundancy information is supplied to each block in paired check columns for rows and in paired check rows for columns. Thereafter, the data is dispersed from the data block in a reproducible but nonserial manner to the disc surface to minimize the impact of burst errors from blemishes introduced in the disc replication process. One technique to accomplish this dispersion is to read the data from the block in a diagonal pattern; another technique is to read data from the block according to a reproducible pseudo random sequence. The resultant dispersion when inverted upon reading data from the disc into a semiconductor RAM locates serial and consecutive byte errors from the disc at locations where they are individually detectable and discretely correctable by separate portions of the Reed/Solomon error-correction redundancy.

An advantage of this aspect of the invention is that the constituent parts of serial error bursts are individually addressable by the redundancy code. This being the case, they may be corrected to a high degree of reliability.

Yet another aspect of the invention disclosed is to create in a three-dimensional data array a dispersion technique. According to this aspect of the invention, and in the three-dimensional data cube herein disclosed, data is written diagonally from a three-dimensional array or field of this invention. One preferable format of diagonal writing includes writing the first byte of field from row 0 column 0 and block 0. The second byte is then taken from row 1, column 1, of block 1. Row, column and block addresses are each incremented by 1 after each byte is written. Incrementing a row, column or block address of 31 returns it to zero. Incrementing of the column address is suppressed if the row address register contains 31 at the time of its increment. Following address register incrementing, the block address register contents are tested for '0' or '1' then the row and column address registers are saved in backup registers. These registers are restored to the row and column address registers if the contents of the block address register are '0'. A diagonal recordation of a three-dimensional data array occurs.

An advantage of the three-dimensional diagonal read is that the probability of sequential bursts of error rendering the data field not capable of being corrected upon read are suppressed to a high degree. Incidences of two bytes of the same burst error appearing in a row, column or block direction so as not to be correctable are suppressed and all but eliminated. An arbitrary byte error in a three-dimensional data field has associated with it three pairs of redundancy bytes (call them $X_0$, $X_1$; $Y_0$, $Y_1$; $Z_0$, $Z_1$). Each pair of redundancy bytes is capable of locating and correcting the byte error providing that other multiple byte errors in the data field do not occur along the X, Y and Z vectors. The interleaving scheme disclosed in this patent assures that any byte errors in a serial error burst from the optical video disc having redundancy byte pairs ($X_0$, $X_1$; $Y_0$, $Y_1$; $Z_0$, $Z_1$) and ($X_0'$; $X_1'$; $Y_0'$; $Z_0'$; $Y_1'$; $Z_1'$) have $X \neq X'$, $Y \neq Y'$, $Z \neq Z'$ for an error burst length of up to 30 bytes and if $X = X'$, then $Y \neq Y'$ and $Z \neq Z'$ or if $Y = Y'$ then $X \neq X'$, and $Z \neq Z'$ or if $Z = Z'$ then $X \neq X'$ and $Y \neq Y'$ for error bursts up to 900 bytes in duration. Further, all other forms of error configuration are likewise suppressed from preventing the three-dimensional data array (data field) from being verified and/or error located and corrected.

An additional object of this invention is to disclose a format of group correction. According to this aspect of the invention, 63 fields of data provided with redundancy information and diagonally interleaved are XORd to a memory which is sized to the three-dimensional array. The resulting XOR sum is a redundant field which completes the group, the group having a total of preferably 64 fields.

An advantage of this aspect of the invention is that any uncorrectable field can be regenerated by XORing the other 63 fields of the group to which it belongs. This regeneration capability is reinforced by all the steps of the error-correction protocol up to the redundant field level. Therefore data recovery from a high incidence of localized error can occur.

Yet another object of this invention is to disclose a medium (preferably an optical video disc) in which constituent fields are maximally, spatially separated to form a group. Specifically, and assuming that 108,000 fields are present on a disc, related fields of a group are spaced and distributed 1 in 1686 sequential fields. A format having 64 fields in a group, any one of which is recoverable from the other 63 and with the corresponding data byte positions (X, Y, Z) of sequential fields of a group being separated by no less than 2.8 mm, is thus disclosed.

An advantage of this aspect of the invention is that local defects in the optical disc surface cannot carry over to and inflict with error other adjacent fields without implying substantial destruction of the entire disc surface.

A further advantage of this invention is that the medium can be of many forms. For example the medium can be a video tape, an optical master for optically recorded data, a replication as by stamping, a video disc, a CAV video disc, a CLV video disc, or a high-density magnetic medium such as vertical recording.

Yet another advantage of the entire error-correction protocol herein disclosed is that it is weighted for complexity on the write side. Complex processing can occur at slower speeds. Once the data is encoded according to the disclosed format, it thereafter may be recorded and recovered at high speeds (on the order of two megabytes per second).

Yet another object of the invention disclosed is to create a block format which, standing alone, is capable of error detection and correction without error detection and correction of adjoining blocks. According to this aspect of the invention, data with error-correction redundancy as heretofore described is read from the disc to a 32×32-byte block in RAM. Thereafter, two rows of column syndromes and two columns of row syndromes are generated; nonzero syndrome values indicate presence of error.

The reader will recognize that by not requiring any particular algorithm we do not attempt to patent the mathematical algorithm.

An advantage of this aspect of the invention is that the block can be individually addressed and decoded very fast, since in most cases adjoining blocks need not be decoded.

A further advantage of the disclosed design is that by rendering the Reed/Solomon algorithm or other selected algorithm having two discrete redundancy values, the system is capable of both data error location and data regeneration of a single error. Successive iterations can occur row and column or column and row. Thus, where two errors occur in any row or column and are, therefore, not correctable by the disclosed Reed/Solomon algorithm, in that particular row or column, correction in the other dimension has a high probability of clearing the errors.

As the Reed/Solomon algorithm is performed, the data part of the block and at least one auxiliary check byte are used to complete an auxiliary check syndrome. An auxiliary check syndrome of zero indicates with high probability the absence of error. The data is thus verified at the block level to be error free to a high degree of certainty.

Yet another advantage of the disclosed algorithm is that if the errors in a block exceed correction capability, flagging of the uncorrectable errors is assured by the multidimensional format presented. An uncorrectable error is indicated when nonzero row or column Reed/Solomon syndromes remain after iteration. An uncorrectable error is also indicated when nonzero auxiliary check syndromes remain after all nonzero row and column Reed/Solomon syndromes have been cleared. These levels of the error-correction protocol, herein disclosed, are needed to render an optical video disc effective in the storage of high-density digital data.

Another object of this invention is to disclose a process for the decoding of blocks. According to this aspect of the invention, the blocks are first decoded in the dimension (row or column) with the most nonzero syndromes.

A further object of this invention is to disclose decoding utilizing a three-dimensional array. According to this aspect of the invention, at least one block of data is decoded as hereinbefore set forth. Errors flagged by syndromes as being present and not correctable are then corrected along vectors in the third (block) dimension of the field array. This correction along a vector in another dimension gives the individual block to be decoded access to independent error correction redundancy through which error is almost always eliminated.

Yet another aspect of this invention is to disclose an error correction protocol wherein massively defective two-dimensional blocks of information can be regenerated in their entirety. According to this aspect of the invention and where an entire block is defective, it is possible to utilize the redundancy in a third dimension for the regeneration of the entire separate block.

Yet another object of the disclosed invention is the correction of a field in which two encoded blocks are shown to be massively defective. According to this aspect of the invention and by knowing two blocks of the field are massively in error, the two blocks may be replaced in their entirety providing that all other blocks in the field can be first corrected and shown to be error free. According to the protocol of this invention, the two error filled blocks can then be corrected using a block-wide double erasure algorithm in the block dimension.

Yet another aspect of this invention is to disclose a group level recovery process. According to this aspect of the invention, and after disinterleaving of the data occurs, corrected fields of a group are XORd to a RAM memory capable of receiving the field-wide XORd sum. By summing 63 fields in one group to such a field-size memory, regeneration of a massively defective field can occur.

Other objects, features and advantages of this invention will become more apparent after referring to the following specification and attached drawings in which:

FIG. 1A is a sketch of the encoding format of this invention illustrating in cartoon series encoding at the block, field and group level with final recording to a video format, here shown as an optical video disc;

FIG. 1B is a sketch of the resultant video disc illustrating the high data density present on the disc, this figure shows errors that result when reading digital data from the disc, especially those errors which are irreversibly present due to disc defects;

FIG. 1C illustrates the dispersion of 64 fields in a group. With any 63 fields of the group capable of regenerating the 64th;

FIG. 2 is a three-dimensional perspective of a three-dimensional memory array utilized by this invention illustrating the data dispersion technique of this invention;

FIG. 3A is a block diagram which illustrates the preferred data write system of this invention;

FIG. 3B is a block diagram schematic which illustrates the preferred data read system of this invention;

FIG. 4 is a logic diagram for generating auxiliary check bytes applicable to the last 3 bytes of the 30×30 data field utilized with this invention;

FIG. 5 is a logic diagram of circuitry utilized to generate Reed/Solomon check bytes for the row, column and block dimensions; it being remembered that the Reed/Solomon code is the preferred, but not exclusive, embodiment of this invention;

FIG. 6 is a diagram of the logic utilized for generating syndromes and upon determination of nonzero syndromes outputting a location signal and an error value signal;

FIG. 7 is a continuation of the circuitry of FIG. 6 with the capability of adjusting column syndromes upon correction of a row;

FIG. 8 is a continuation of FIGS. 6 and 7 illustrating the continuous adjustment of the auxiliary check syndromes upon correction occurring anywhere within the data part of a block;

FIG. 9 is a block diagram of the preferred firmware embodiment of the logic described in FIGS. 6, 7 and 8;

FIG. 10A is an illustration of a data block shown in hex format including data and redundancy areas with errors present;

FIG. 10B is the block of FIG. 10A after a row pass of the error-correction code scheme here disclosed; and, FIG. 10C indicates the regenerated original block after a row and column pass in accordance with the teaching of this invention;

FIG. 10D is a sketch of a block containing errors such as that illustrated in FIG. 10A, the block here illustrating the generation of two columns of row correction syndromes, two rows of column correction syndromes; these syndromes being utilized for flagging error; this sketch illustrating a block requiring the double erasure correction algorithm;

FIG. 10E illustrates a block containing errors similar to FIG. 10D, except that the errors are located in a pattern so as not to be correctable with block level correction algorithms. This pattern requires one or more of the byte errors to be corrected using the block or z axis; redundancy located along the vector normal to the block containing error;

FIG. 10F shows errors similar to those in 10E, except that errors indicated by the check byte syndromes in other blocks of the field have triggered two-dimensional correction of those blocks before z-axis correction;

FIG. 10G shows two-erasure correction of two blocks in a field that have error patterns preventing correction at the block level;

FIG. 10H illustrates the group level correction sequence for data that has remained uncorrectable at the field level;

FIG. 11A is a flow chart of the entire read and decode algorithm of this invention;

FIG. 11B is an expansion of the two-dimensional block correction algorithm of this invention;

FIG. 11C is an expansion of the double erasure block correction algorithm of this invention.

FIG. 12 is a microword layout sheet which when utilized with the microfiche appendix discloses the microprocessor logic.

Included in the microfiche appendix is a pseudo code representation of the algorithms of FIG. 11, the microcode resident in the dedicated computer of FIG. 9, and the schematics for that microcomputer.

Referring to FIG. 1A, the generation of a replicated optical disc A is illustrated in cartoon schematic. The preferred array format is shown.

A block array 50 is serially created in RAM, memory row after column indexed row. Specifically, data is placed at row 0 from column positions 0–29. It is similarly repeated for each row position until row 29. At row 29 raw data is placed from column position 0 through column position 26. Column positions 27, 28, and 29 of row 29 are left vacant for the receipt of auxiliary check bytes.

Referring to block 51, the redundant bytes 27, 28 and 29 are shown in place. These redundant bytes are derived from the existing 897 data bytes. The presence of error within the entire block can be flagged as hereinafter disclosed using these auxiliary check bytes.

Referring to block 52, the process of completing a block with redundant information is illustrated. Specifically and as hereinafter disclosed, redundant check bytes derived using an error-correction code are used to fill row correcting columns 30 and 31 of block 52 and column correcting rows 30, 31 of block 52. One has at block 52 a novel construction comprising the normally disposed error-correction check bytes in combination with the auxiliary check bytes 27, 28 and 29.

Referring to field 53 one can see how it is dimensionally constructed. Specifically, the field includes blocks 0 through 29 constructed as 52 with redundant blocks 30 and 31 divided in the same manner as for the redundant rows and columns only in the Z (or block) dimension. These redundant blocks are derived from all of the constituent data blocks 52 making up field 53.

Going to the fully constructed field 54, one can understand how diagonalization disperses sequential error bursts. Specifically and once block 54 is completely constructed, it is diagonally mapped into the buffer memory as hereinafter disclosed. This diagonal mapping occurs in directions parallel to the cube diagonal of the three-dimensional array shown in FIG. 2. By proper incrementing of row, column and block dimension addresses, all of the data from the original data cube 54 is mapped to a buffer memory sequentially along directions parallel to the cube diagonal.

In passing one can note that serial bursts of error introduced after this diagonalization step will be written along directions parallel to the cube diagonal and have their sequential bytes individually addressable by discrete and correspondingly separate pairs of error correction code after data has been placed into the original field format. An additional process is performed in the buffer memory after diagonalization. This process identifies every 1686th field as an element of a group comprised ultimately of 63 data fields which are XORd to create a 64th redundant data field 56. This redundant data field is stored in the appropriate place in buffer memory for processing onto the VTR. The complete diagonally interleaved field 54 is then sequentially recorded preferably to a VTR as indicated at 55.

Optical mastering then occurs. Preferably this mastering occurs with related and XORd data being written once every 843rd NTSC frame (alternating between NTSC fields 1 and 2) thus 64 related fields of a group are dispersed over the entirety of the disc.

An optical master 57 is typically produced from a 1-inch Type C video tape 55 after which stamping of the optical disc A occurs. This stamping of the optical disc A results in an optical disc which is shown in FIG. 1B. By discussing the optical disc of FIG. 1B, one can understand the resultant error-correction code format as well as the resultant types of error that may be present in the disclosed data recordation system.

Referring to FIG. 1B, a disc sold under the trademark Scotch Videodisc, manufactured by the 3M Company is disclosed. Recorded on this disc in an analog NTSC television signal format are 54,000 TV frames. The disc spins at 1800 RPM and includes a TV frame stored on each revolution of the disc in the CAV format. Simply stated, the format which the disc embodies constitutes a color television signal used in an analog mode to accomplish the recordation of multi-bit events (preferably 3 binary bits per event).

An encoding system which is being developed by co-workers is the preferred environment for the operation of this disclosed error correction protocol and can be summarized as follows. Utilizing the synchronization provided by the analog television signal format, a phase locked loop generates a 3.58 MHz signal. This 3.58 MHz signal is frequency doubled to 7.16 MHz and used in cooperation with an imbedded system time clock. The clock opens appropriate windows to sample each passing event on an impulse basis in the picture portion of the television signal. The entire television signal includes horizontal and vertical sync pulses, chromaburst and picture information. Approximately 380 events per line or 90,000 events per TV field are utilized to transmit data at rates up to 2 megabytes per second from the disc surface.

In the scheme here utilized, several types of errors are anticipated. Specifically, data may be rendered unreadable by large disc blemishes 10 caused by occlusions in metallization or by replication defects. Similarly, and like any other data bearing disc, scratches 11 may appear on the disc. Finally, errors originating in the premastering process or video tape source may propagate along the circumference of a track 12. All of these defects can contribute significant error bursts. In addition, random byte errors result from several sources of electronic and media noise.

The error bursts described above heretofore have been an impediment to the use of the optical video disc as a data storage medium. Specifically, if such error bursts are large or repeated in identical locations from track to track, data may be lost and may not be capable of being regenerated by previously known techniques. As will hereinafter appear, a scheme of three-dimensional diagonal writing and reading and spatially separated group level of redundant information to overcome the problem is used. The diagonal configuration results in errors being discretely addressable by differing and completely separate parts of the redundancy code with little chance of long error bursts rendering the error-correction code ineffective. As also illustrated in FIG. 1B the 64 fields comprising the group level of redundancy are maximally spatially separated on the disc surface. Fields of a group are separated by 843 tracks and consecutive fields alternately reside in fields 1 and 2 providing an effective separation of 1686 tracks or 2.8 mm between identical row, column and block locations in fields of the same group.

Referring to FIG. 3A, an overall block diagram of the writing or premastering system of this invention is disclosed. Specifically, data stored on magnetic tape 13 is loaded from reels through applicable playback equipment. This data is then processed through a computer 15 (a PDP 11/34 manufactured by Digital Equipment Corporation of Maynard, Mass., USA, in the preferred embodiment). The computer delivers data to a 32k by 32k FIFO buffer 16. The FIFO buffer transfers this data to an error-correction code processor 18 the principle of this processor being illustrated in the error-correction code portion of this application at FIGS. 4 and 5. After addition of Reed/Solomon redundancy at the row, column and block levels as per FIGS. 4 and 5, the ECC processor also performs the three-dimensional diagonal interleave prior to distributing the now-completed data blocks. The data and generated redundancy is further parcelled by Multibus processors 22, 24, 26 and 28 to selected locations on 474-megabyte fixed disc drives 30–41. In the preferred embodiment, these Multibus processors are sold under the trademark DBC68K and are a product of the Microbar Systems, Inc., USA. The disc drives are sold under the trademark Eagle and are a product of Fujitsu America, Inc.

The data with redundancy appended is first stored in the respective disc drives, and subsequently is delivered in a continuous controlled data stream to the video tape recorder 55. Typically, this data stream is merged, buffered through 128K byte × 8-bit FIFO buffers 61–64 and played through a video generator 45 and then sent through a digital filter 50.

In operation, digital data is delivered to the premastering facility on reels of magnetic tape. This data is typically transferred by a computer (PDP 11/34) to a FIFO memory. At the output of the FIFO memory, the information is transferred to the error-correction code processor. Once processed, it is thereafter distributed to the staging magnetic disc drives.

From the magnetic disc drives, it is serially written to the video tape recorder. A companion video tape recorder transfers the (now analog) signal from the video tape to an optical master by a laser writing technique and replications are made from metal stampers derived from the optical master.

CONSTRUCTING PREMASTERING DATA

Having set forth the major aspects of the invention as well as the preferred writing environment in which it resides, writing to the memory portion of the error-correction code processor will be set forth in detail.

Referring to FIG. 2, each block of data will be seen to be organized into a 30-row by 30-column format. This 30-row by 30-column format has all but the last 3 bytes of row 29 containing the data field. Attention is directed first to the manner in which data is written to such a field and therafter to the manner in which data is read from such a field.

FIG. 2 is a block diagram of a three-dimensional memory. Each memory field includes rows 0 through 31 and columns 0 through 31. Data occupies rows 0 through 29 and columns 0 through 29 with one exception. The last 3 bytes in row 29 at respective column locations 27, 28, and 29 are occupied by auxiliary check bytes. Reed/Solomon check bytes occupy rows 30 and 31 and columns 30 and 31. The computation of auxiliary check bytes will be illustrated hereinafter with respect to FIG. 4. First the auxiliary check bytes 27, 28, and 29 are generated from the data and written at row 29 in columns 27, 28 and 29, and then the Reed/Solomon check bytes are generated. Reed/Solomon check byte generation is accomplished according to the circuit of FIG. 5 attached hereto. Rows 0 through 29 are each sequentially processed according to this circuit. The resulting Reed/Solomon check bytes are written at columns 30 and 31 of each row. Thereafter, columns 0 through 31 are each processed according to the circuit of FIG. 5 and the resutling Reed/Solomon check bytes are written at rows 30 and 31 of each column.

It is possible to accomplish error correction using finite field arithmetic. What we generate are two discrete pieces of redundancy information known in the prior art as Reed/Solomon check bytes. These check bytes have the characteristic that when a single error byte is present in the data or check bytes, the location and value of the error byte can be computed by processing across the data and check bytes. When location of paired errors is known, corresponding double erasure correction or regeneration can occur.

Many other error-correcting schemes may be used as well. These include other single-error-correcting codes as well as multiple-error-correcting codes.

Having set forward the general theory that the Reed/Solomon code utilized herein employs, it should be understood that we do not wish to preempt the algorithms for the Reed/Solomon code, algorithms which reside in the prior art. Rather, we wish to set forth as our invention, the particular redundancy format which is herein used. This format begins at the block level and includes paired rows and paired columns of redundancy information in combination with auxiliary check bytes at the block level. Pairs of redundancy blocks per field at the field level and a single redundancy field per group at the group level are shown as part of the format. Three-dimensional diagonal interleaving at the field level is a critical part of the format. This redundancy format has the advantage of having a high probability of successful correction for the expected types and rates of error and a high probability of detection for those errors that exceed correction capability. These advantages are owed in part to the manner in which long serial bursts of errors are dispersed throughout a field by the three-dimensional diagonal interleave format.

The scheme of this invention having been described, writing of the information will next be set forth. This includes the formatting of data into the data part of a block in RAM memory, the generation of auxiliary check bytes, and the generation of Reed/Solomon check bytes.

Once this is concluded, the transfer of the data to the video disc occurs through a three-dimensional field mapping taking serial input data and dispersing it along a disc track circumference. With this dispersion, long burst errors from the disc surface have their least impact on the data reconstructed in the original serial frame in the read memory.

The format of a field in RAM memory is shown in FIG. 2. A field contains 32 blocks. Each block contains 1024 bytes and is organized as a 32×32 byte array with 32 columns and 32 rows.

Formatting of data to each block in RAM memory is serial. It typically starts at row 0 and fills each memory byte location of columns 0 through 29. Thereafter, the next row is serially filled; such filling occurs until row 29 is filled.

Row 29 is an exception, because auxiliary check bytes are written at column positions 27, 28 and 29. Thus, at row 29, column position 26, the last serial data byte, is written. Thereafter, with reference to the circuitry of FIG. 5, row and column check bytes are generated.

The reader will understand that we do not restrict this invention to the particular three-geometry format herein disclosed. By utilizing the word "dimension," we include use of a generic label to address data from multiple orthogonal directions. Conventional multidimensional arrays common to the computer industry are included.

A particular algorithm is demonstrated with respect to FIG. 5. It will be understood that many other algorithms may likewise be used. What is important is the format at the block, field, and group levels, including the three-dimensional diagonal interleaving and the reservation of an area for auxiliary check bytes.

Reference is made to the book of one of the co-inventors herein. Specifically, the publication entitled "Practical Error Correction Design for Engineers" by Neal Glover, published October 1982. This book has been deposited in the Library of Congress under copyright claim and may be obtained from Data Systems Technology Corporation, 1801 Aspen Street, Broomfield, CO., 80020. Techniques for generating check bytes such as those illustrated are included in that work.

Auxiliary check bytes are generated according to the following polynomial:

$$(x+\alpha^2)(x+\alpha^3)(x+\alpha^4)=x^3+\alpha^{61}x^2+\alpha^{64}x+\alpha^9$$

This polynomial has coefficients from Galois Field 256 (GF (256)) defined by $x^8+x^6+x^5+x^4+1$. The '+' symbol between terms represents finite field addition (XOR). See the reference to the book.

Before beginning with a description of FIG. 4, a few general comments shall be made about the schematically illustrated circuit. All paths are 8 bits wide. Small circles represent XORs across an 8 bit wide path. Multipliers are constant multipliers over GF(256). All latches are 8 bits wide.

Data is input to the circuit for processing on an 8-bit bus 200. This data is passed directly through a multiplexer 201, out a bus 202, and to the block in RAM memory. It is through this path that block filling occurs for row 0 through row 29 up to column position 26. When row 29, column position 26 has been filled, the remaining bytes in row 29 at column positions 27, 28 and 29 must be filled. This filling occurs with data from the latches $x^2$, $x^1$, and $x^0$.

As data is processed it is first transmitted along a parallel path to a Galois field adder 205. Data from the adder proceeds to gate 206. From gate 206 the data is placed in parallel to constant field multipliers 207, 208, 209.

It will be noted that the Galois field multiplier 207 multiplies by constant alpha-61. Likewise, Galois field multiplier 208 multiplies by constant alpha-64 and 209 by constant alpha-9, all in Galois field 256 (GF(256)). As the data is gated, it passes through the respective latches 211 for value $x^0$, 212 for value $x^1$ and 214 for value $x^2$. At each of these latches, adders 215 and 216 sum in the outputs of multipliers 208 and 207 respectively. The data is continuously divided by the Galois field polynomial. Specifically, as the data is received, commencing at row 0, column 0 and ending at row 29, column 26; latches $x^2$, $x^1$ and $x^0$ are continually updated. Their ending values represent the remainder from pre-multiplying the data polynomial by $x^3$ and dividing the product by the generator polynomial.

Assuming that data has been serially written to row 29, column position 26, null data (here all zero data) is gated to the input bus 200 and gate 206 is disabled. This causes the value in $x^2$ to be written through multiplexer 201 to row 29, column position 27. Data in latch $x^1$ and $x^0$ advances to latch $x^2$ and $x^1$ respectively. Two more introductions of null data into the circuit cause row 29 column positions 28 and 29 to receive the remaining auxiliary check bytes. It may now be seen that the data locations and auxiliary check byte locations are filled. Generation of the Reed/Solomon row redundancy and column redundancy may now be set forth.

Filling the data part of a block and generating auxiliary check bytes creates a 30×30 byte field of information. From this 30×30 byte information field Reed/Solomon check bytes are generated for rows and columns to complete the 32×32 byte block.

Reed/Solomon check bytes are generated according to the following polynomial:

$$(x+\alpha^0)(x+\alpha^1)=x^2+\alpha^{231}x+\alpha^1 \text{ (GF256)}$$

To generate Reed/Solomon check bytes, data from the 30×30 byte data field of a block is processed sequentially by the circuit of FIG. 5 a row at a time and then a column at a time. Data arrives on the bus 300, passes through a Galois field adder 301 and is sent to gate 302. From gate 302 it passes through constant multipliers 303, 304. The data then passes to latches 306 and 305, respectively. Data destined for latch 306 passes through finite field adder 307. When an end of row or end of column condition is reached, data from the latches is filled to the last two columns or last two row positions.

This processing is performed for rows 0 through 29 and also for columns 0 through 31. All positions of the 32×32 byte block in RAM memory will be filled when this processing is complete.

Thirty blocks (0–29) are filled in RAM memory as described. Two redundant blocks (30 and 31) are generated in RAM memory from blocks 0-29. The redundant blocks are generated according to the Reed/Solomon single error-correcting algorithm. Two Reed/Solomon check bytes are generated for each vector in the block dimension by the circuit of FIG. 5. These check bytes are appended to each vector in the block dimension to form the redundant blocks.

MOVING FIELDS FROM RAM MEMORY TO STAGING MAGNETIC DISCS

After all data blocks (0-29) and the redundant blocks (30 and 31) have been completely filled in RAM memory, the field is moved to a staging magnetic disc 30-41. (See FIG. 3A) A field is written to the staging disc in a sequence of consecutive multi-bit binary words using the three-dimensional diagonal interleave format. The first byte of a field to be written is taken from row 0, column 0 of block 0. The second byte is taken from row 1, column 1 of block 1. Row, column and block addresses are each incremented by one after each byte is written. Incrementing a row, column or block address of 31 returns it to zero. Incrementing of the column address register is suppressed if the row address register contains the value of 31 at the time of its increment. Following address register incrementing, the block address register contents are tested for '0' or '1'. If the contents are '1' then the row and column address registers are saved in backup registers. These registers are restored to the row and column address registers if the contents of the block address register are '0'. The reader will recognize that this is only one of many possible "diagonal" read formats, but is preferred to allow easy change of the number of blocks in a field.

One final redundancy level is utilized. Specifically, 63 fields such as the one illustrated in FIG. 2 are XORd to generate the redundant field of a group. Redundant fields are also stored on the magnetic staging discs. On video disc, fields of a group are dispersed across the entire surface. Specifically, fields of a group are separated from each other by 843 tracks. However since sequential data fields of a group appear in alternate TV fields, the effective separation is 1686 tracks as illustrated in FIG. 1C.

The writing of fields from the staging discs to the intermediate video tape is accomplished by the Multibus processors 22, 24, 26 and 28. (See FIG. 3A) The data must be recalled from staging magnetic discs and converted by a digital filter to an NTSC format analog TV signal before writing to the intermediate video tape at a continuous very high rate (approximately 2MB/sec). The intermediate video tape is then used in a laser mastering process to produce a master video disc. Video disc copies are made from the master disc by a stamping process.

ERROR-CORRECTION DECODING ON READ

The recorded and stamped copies must be read and decoded. A block diagram illustrating the preferred environment for such a read occurs in FIG. 3B. An optics package 100 focuses a laser beam on a desired track of the replicated optical disc 90 and transforms the returning modulated light intensity into an analog signal. This analog signal is processed through the RF channel 110 into a baseband video signal whose amplitude as a function of time represents the stored digital data. A clock reference signal and the video output from the RF channel are fed to data extraction circuitry 130. A digital signal is then derived and decoded into data with the ECC overhead. This data and ECC overhead are disinterleaved one field at a time by the ECC processor 150. ECC processor 150 is also where error detection and correction are performed before data is handed off to the host microprocessor 160 for distribution to the user.

Two facts are essentially nonalterable in high-speed data transmission from a stamped video disc. First, the data must be transmitted at the video disc speed of approximately 2 million bytes per second. Secondly, deletion of erroneously recorded data is not possible. The transmission of data with sufficient redundancy information must occur so that regeneration can occur in spite of inevitable errors tht are present.

The generation of a block of data has been previously explained. An exemplary block of data is illustrated in FIG. 10C. Here, the block of data has each byte represented in a hexadecimal format. A 32×32-byte format is illustrated with 3 auxiliary check bytes on row 29 at column positions 27, 28 and 29. Columns 30 and 31 contain Reed/Solomon check bytes for row correction and rows 30 and 31 contain Reed/Solomon check bytes for column correction.

As data is read from video disc to a field in RAM, errors will occur. Specifically, a typical error occurrence is shown in FIG. 10A. The data of FIG. 10A will be processed through the circuits of FIG. 9 according to the logic represented in FIGS. 6, 7, and 8. Once it is processed through the circuits, most errors will be eliminated.

For purposes of the specification herein, the processing of a row correction circuit which takes the error appearing in FIG. 10A and reduces it to the error appearing in FIG. 10B will be shown. Using essentially the same circuit, the clean data field of FIG. 10C will be reached by a column iteration on the field of FIG. 10B. It will be left to the reader to change the row logic into the logic which corrects columns. Thereafter, other levels of error correction will be discussed.

The circuit indicated in FIG. 6 uses the data from an existing row and generates two parameters, assuming that there is only one error in a given row. These parameters are the location of the erroneous data and the binary value necessary to be XOR'd to the erroneous data to regenerate correct data.

Given the following syndrome equations:

$$S0 = e1$$

$$S1 = e1 \times \alpha^{L1};$$

a single error can be located and corrected. Since $S0=e1$, the pattern is simply S0. The equations may be solved for $\alpha^{L1}$ by substituting S0 for e1 in the second equation.

$$S1 = S0 \times \alpha^{L1}$$

$$\alpha^{L1} = \frac{S1}{S0}$$

$$L1 = LOG_\alpha(S1/S0)$$
$$L1 = [LOG_\alpha(S1) - LOG_\alpha(S0)] MOD 255$$

This equation is solved by the digital logic of FIG. 6.

For the two-erasure case the syndrome equations become:

$$S0 = e1 + e2$$

$$S1 = e1\alpha^{L1} + e2\alpha^{L2}$$

When performing erasure correction the error locations are known and the syndrome equations become a set of simultaneous linear equations with the error values as unknowns and the error location vectors as coefficients.

This set of simultaneous linear equations can be solved by determinants.

$$e1 = \frac{\alpha^{L2}S0 + S1}{\alpha^{L1} + \alpha^{L2}}$$

$$e2 = \frac{\alpha^{L1}S0 + S1}{\alpha^{L1} + \alpha^{L2}}$$

For e2 there is an alternative equation as follows:

$$e2 = e1 + S0$$

Referring to FIG. 6, row 0 data is sequentially gated to an 8-bit-wide serial bus 400. The data is placed through adder 401, syndrome memory 403, and constant multiplier 405 in a first path to generate a syndrome in first syndrome memory 403. Secondly, and in syndrome memory 404, a second syndrome is generated for the row being processed. Assuming that these respective syndromes are other than 0, two values are then generated. The first is the location of the error. The second is the value required to be added to the data to correct the error.

Accordingly, each of the quantities from syndrome memories 403, 404 are converted to logarithmic values in log tables 414, 415. These respective values are passed to a binary adder with the value of the log from log table 415 being subtracted from the value of the log from log table 414. The result is the error location.

If zero syndromes result at syndrome memories 403, 404, the resultant process through the remainder of the circuit will likewise be null. Null syndromes S0$_j$ and S1$_j$ are flags indicating that at least for the particular data present in the field, no correction is necessary. Therefore, the output of all the circuitry upstream from FIG. 7 would be null.

Assuming that nonzero syndromes result, the upstream circuitry will be active. Two values will be generated. One will be the value to be XORd with existent erroneous data at the location of the error to regenerate the valid data. The second value is the location of the error, given by the output of binary adder 420.

Assuming that a nonzero syndrome has been generated, the binary adder output points to the location of the erroneous data in ram-buffer 425. Typically data at a given row from column position 0 to column position 31 will be gated.

Secondly, and while this data is gated in, the XOR 426 will receive that value which when XOR'd to the erroneous data value will yield a correct and regenerated data entry into the entire data field, provided that a single error occurred. Assuming in FIG. 6 that one error is present in a row the logic will first generate the location of error and thereafter regenerate in the ram-buffer 425 the corrected data.

At this point, it would be well to return to FIG. 10A. Suppose the logic illustrated in FIG. 6 effected a correction. Further suppose that such a correction was made utilizing the row syndromes S0, S1, generated for each of the rows. Assume that the erroneous hexadecimal data value "5E" at row 7 is corrected. One can immediately see that the column syndromes should be adjusted. As the data has been regenerated, adjustment is required. We must, therefore, return to FIG. 7 to see how adjustment is effected.

Referring to FIG. 7, the row syndrome 430 is gated to the first column syndrome value S0$_j$ in syndrome memory 434. This row syndrome is XOR'd at XOR 433 to generate an adjusted syndrome. The second syndrome includes a binary adder having gated therein location information. Specifically, the row number at 436 is subtracted from a constant of the total number of rows (31) at 435 in a binary adder 437. Output of this binary adder is input to an analog table 438 whose output is applied to a GF(256) multiplier 440. The multiplier output is added to the column syndrome present at finite field adder 443 to place the adjusted column syndrome in syndrome memory 442.

Assuming that the row correction proceeds, it now becomes important to adjust the auxiliary check syndromes as each correction is made. Each time a data correction is made, anywhere within the 30×30 data field, corresponding adjustment must be made to the auxiliary check byte syndromes. These check bytes appear on FIG. 10A at row 29 respective column positions 27, 28, 29. FIG. 8 has the binary circuitry for effecting this correction.

Location information is first added. Specifically, and from FIG. 6, location information 432 is gated in. This is subtracted from a constant of 899 (the 30×30 field minus 1) at a binary adder 460 (modulo 255).

A binary adder (modulo 255) 470 subtracts these respective two outputs. Thereafter, it is placed through an antilog table 471 and then to logic for computing the auxiliary check byte equation.

Likewise and to the same logic for computing the auxiliary check byte locations 430 error value data will be gated in. This error value data at 430 from FIG. 6 goes to the syndrome equation logic.

Referring to the syndrome equation logic, a Galois field square apparatus 480, cube apparatus 482 and 4th power apparatus 483 all take the output of the analog table 471 to Galois field multipliers, respectively 486, 487, 488. The other side of the multiplier includes input of the error value from 430. The outputs of the multipliers are each passed through a binary XOR and to a latch (XOR 490 and latch 491 in the case of multiplier 486, XOR 492 and latch 493 in the case multiplier 487 and XOR 494 and latch 495 in the case of multiplier 488). We now return to the sequence of the data correction of FIGS. 10A, 10B and 10C.

The auxiliary check syndromes are sequentially adjusted.

Where one or two blocks cannot be corrected, as indicated by nonzero row or column syndromes remaining after row and column correction, or by nonzero auxiliary check syndromes, regeneration of all the blocks in a field follwed by processing those regenerated blocks can lead to the regeneration of the defective block or blocks.

Likewise, where a field is not correctable, XORing of the remaining 63 fields of the group containing the uncorrectable field from their dispersed position on the disc will result in the regeneration of the defective field. Block and field level corrections are required for every block and field of the 63 fields.

Referring to FIG. 10D, correction at the block level is illustrated. Specifically, a data field 500 is shown having paired errors on rows 10 and 20. These errors are indicated by the "x" symbol.

Referring to FIG. 10D, and realizing that error code syndromes will be generated, one may see paired error flags denoted by nonzero $S0_j$ in the row and column syndromes positions 501, 502. We have previously demonstrated how a single error may be located and corrected. The reader can see that a Reed/Solomon double-erasure correction algorithm can be utilized in the case of the four errors here present. Specifically, by knowing the error locations, the errors can be corrected using the Reed/Solomon double-erasure correction algorithm as follows:

For the two-error case the syndrome equations become:

$$S0 = e1 + e2$$

$$S1 = e1\alpha^{L1} + e2\alpha^{L2}$$

When performing erasure correction, the error locations are known and the syndrome equations become a set of simultaneous linear equations with the error values as unknowns and the error-location vectors as coefficients.

$$S0 = (1)e1 + (1)e2$$

$$S1 = (\alpha^{L1})e1 + (\alpha^{L2})e2$$

This set of simultaneous linear equations can be solved by determinants.

$$e1 = \frac{\alpha^{L2}S0 + S1}{\alpha^{L1} + \alpha^{L2}}$$

$$e2 = \frac{\alpha^{L1}S0 + S1}{\alpha^{L1} + \alpha^{L2}}$$

There is an alternative equation for e2 as follows:

$$e2 = e1 + S0$$

Now let us assume, that errors additionally appear at locations 503 in FIG. 10E denoted by the symbol "+" in FIG. 10E. It will be seen that this block will not be capable of error correction using the redundant data within the confines of one two-dimensional array or block. The reader will understand that FIG. 10E is only illustrative of error patterns that are not correctable using redundant data within the block. The reader should also bear in mind that with the additional errors 503 present, the auxiliary check byte syndrome shown at 504 will indicate error.

Referring to FIG. 10E a first attempt at correction is illustrated. Specifically, and in a field containing 32 blocks such as that illustrated in FIG. 2, individual errors in a block can be corrected along a vector orthogonal to the the block using the paired redundant Reed/Solomon blocks of the field; these blocks being located at block positions 30, 31 in the field.

Specifically, Reed/Solomon error correction code syndromes are already computed and with value flag possible locations of error in respective rows and columns. These row and column locations at their intersections flag possible error sites.

For each possible error site, Reed/Solomon syndromes are computed along vectors in the block or Z dimension starting at these intersections.

The reader should realize at this point, the block or Z dimension correction algorithms are restricted to the mapped sites; no syndrome computations are made in the block or Z dimension at locations other than the possible error sites.

Referring to FIG. 10F, all of the blocks or two dimensional arrays except the uncorrectable block of a field are shown corrected in accordance with the two-dimensional error-correction code protocol of FIGS. 10A-10C. Once this correction has occurred, the z-axis is used for the vector correction of uncorrectable error in the uncorrectable block. This correction occurs along the now corrected blocks. Error is removed to a high degree.

Referring to FIG. 10G and assuming that the steps illustrated in FIG. 10F did not result in complete error-correction, one can see that the auxiliary check syndromes 504 for block 500 and 505 for block 530 will locate the blocks 500, 530 as still containing errors. Using these auxiliary check syndrome flags to these blocks and having two or less defective blocks, one may use the two Reed/Solomon redundant blocks at the field level to entirely correct up to two uncorrectable blocks 500, 530. This procedure is called field level correct. Either a single erasure algorithm or a two erasure algorithm can be performed.

Referring to FIG. 10H, a protocol is set forth for correcting an uncorrectable field containing more than two uncorrectable blocks. The reader will remember tht the diagonally interleaved data field is XORd with 62 other data fields to create a group of 63 data fields plus the XOR sum. When an uncorrectable field is encountered the other 63 fields of the group containing the uncorrectable field are each error corrected by the special computer and then passed onto a higher level computer for XOR to regenerate the desired field.

During the correction of FIG. 10H the reader will naturally recognize that while fields are being assembled in a group of 63 fields to regenerate the 64th field, error correction as heretofore set forth may be produced on all or a part of the assembled fields.

The reader will note that we cease reference to the logic diagrams (FIGS. 6-8) but rather make reference to the block diagram of a special purpose computer construction (FIG. 9) and a pseudo code representation of the microcode resident in that computer. This code representation follows below. The preferred embodiment of this invention is presented withthe schematics of the special computer, the microword diagram and the source code filed on microfiche herewith.

The dedicated computer (FIG. 9) takes data from the data extraction circuitry (FIG. 3B) and performs a hardware disinterleave of a field of data into semiconductor RAM 650. Once the complete field of data has been loaded into the RAM, error detection and correction can occur.

After transmission as by recording, the data is reconstructed into its original serial format in a three-dimensional cube. The disclosed microcode controls all the basic computer functions (e.g. XOR add, subtract, register/address manipulation and PROM lookup) to perform the syndrome calculations, nonzero syndrome identification, row correction, column correction, two dimensional iteration (block correct), double erasure algorithm block correct, z-axis correct, reread, field single block erasure, and field double block erasure. The reader will thus be able to completely reconstruct the apparatus disclosed in this invention.

Referring to FIGS. 11A, 11B, and 11C, the following pseudo code enables tracking of the block flow diagrams.

ERROR DETECTION AND CORRECTION PROCESSING

Byte-wide data from the analog to digital converter is entered into a random access memory. The diagonalization of the data that was encoded on the disc is removed by control logic that properly increments the memory address counters. An entire field of information is read in with blocks of data located every 1024 locations.

Once a field from the disc is loaded into the 2901 field buffer, error detection and correction can begin. The first level of error detection and correction is block level correct. The second level of error detection and correction is field level. The following is a pseudo-code description of the block and field level error detection and correction scheme within the 2901 board.

BEGIN
generate row and column syndromes and aux bytes for a single block in the field there are two syndromes for every row and column, the first syndrome is generated by an exclusive-or of all the data in the row or col., the second syndrome is generated by an exclusive-or of a table lookup from the 4 K×8 PROM and the row or column data, the table lookup address is the result of the previous exclusive-or, store the syndromes as they are generated to the 1 K×8 static RAM if syndromes are not equal to zero then do CORRECT_BLOCK else if syndromes equal zero and aux bytes not equal zero then bad block do REREAD to correct current block else if syndromes equal zero and aux bytes equal zero then no errors in current block correct next block do BEGIN

CORRECT_BLOCK do TWO_DIMENSIONAL_CORRECT if syndromes still not equal to zero then do DOUBLE_ERASURE_*CORRECT* else EXIT_CORRECT_BLOCK if syndromes still not equal to zero then do Z_AXIS_CORRECT else EXIT_CORRECT_BLOCK if syndromes still not equal to zero then do TWO_DIMENSIONAL_CORRECT else EXIT_CORRECT_BLOCK if syndromes still not equal to zero then do DOUBLE_ERASURE_CORRECT else EXIT_*CORRECT*_BLOCK if syndromes still not equal to zero then bad block do REREAD to correct current block

EXIT_CORRECT_BLOCK if aux bytes not equal to zero then bad block to REREAD to current block else if aux bytes equal zero then correct next block do BEGIN

TWO_DIMENSIONAL_CORRECT if 2×N or N×2 error pattern in block return to BLOCK_CORRECT and allow double erasure correction to correct block if greater number of errors in rows than columns then do ROW_CORRECT else do COLUMN_CORRECT

ROW_CORRECT using row syndromes find location of bad byte in row and exclusive-or first row syndrome with data byte to correct byte, this involves a read modify write to one location in the 2901 field buffer zero row syndromes and update column syndromes and syndrome aux bytes repeat ROW_CORRECT until all 32 rows have been examined if syndromes zero or 2×N or N×2 error pattern then return to BLOCK_CORRECT else if row and column correction iterations less than or equal to 3 do COLUMN_CORRECT else return to BLOCK_CORRECT

COLUMN_CORRECT using column syndromes find location of bad byte in column and exclusive-or first column syndrome with data byte to correct byte zero column syndromes and update row syndromes and aux bytes repeat COL_CORRECT until all 32 columns have been examined if syndromes zero or 2×N or N×2 error pattern then return else if row and column correction iterations less than or equal to 3 to ROW_CORRECT else return to BLOCK_CORRECT

DOUBLE_ERASURE_CORRECT if error pattern not 2×N or N×2 then return to BLOCK_CORRECT if 2 errors in row do DOUBLE_ERASURE_ROW_CORRECT
else if 2 errors in column do DOUBLE_ERASURE_COLUMN_CORRECT

DOUBLE_ERASURE_ROW_CORRECT perform REED/SOLOMON double erasure algorithm on all columns with syndromes not equal to zero, this involves modifying two bytes in each bad column at locations determined by bad row address 1 and bad row address 2, a bad row or column is any row or column with non-zero syndromes, aux bytes are updated after every byte modification byte modification requires the generation of two error pattern correction bytes using the bad row addresses and column syndromes 1 and 2, the first error pattern correction byte is exclusive-ored with the bad byte located at bad row address 1 and column X, the second error pattern correction byte is exclusive-ored with the bad byte located at bad row address 2 and column X if aux bytes equal zero then zero syndromes and return to BLOCK_CORRECT else correction failed, restore original data and return to BLOCK_CORRECT

DOUBLE_ERASURE_COLUMN_CORRECT perform REED/SOLOMON double erasure algorithm on all rows with syndromes not equal to zero, this involves modifying two bytes in each bad row at locations determined by bad column address 1 and bad column address 2 for details of bad byte modification refer to DOUBLE_ERASURE_ROW_CORRECT (when the word row is used substitute column and vice versa)

if aux bytes equal zero than zero syndromes and return to BLOCK_CORRECT else correction failed, restore original data and return to BLOCK_CORRECT

Z_AXIS_CORRECT using the row and column syndromes stored in the 1 K×8 static RAM determine the location of a bad byte in the block generate syndromes in the Z direction and use those syndromes to calculate which block the bad byte occurs in if the current block address and the calculated block address match then correct the byte and update the row and column syndromes and aux bytes repeat until all bad bytes in the block have been tried

REREAD if reread has occurred less than 3 times then read field again allowing only uncorrected or uncorrectable blocks to be stored to 2901 field buffer RAM else do FIELD_LEVEL_CORRECT

FIELD_LEVEL_CORRECT look for a bad block and generate syndromes for that block do TWO_DIMENSIONAL_CORRECT if block still bad do DOUBLE_ERASURE_CORRECT repeat until all bad blocks have been tried if no bad blocks then the field is correct EXIT_CORRECTION else look for a bad block and generate syndromes for that block do Z_AXIS_CORRECT if block still bad do TWO_DIMENSIONAL_CORRECT if block still bad do DOUBLE_ERASURE_CORRECT repeat until all bad blocks have been tried 3 times or no bad blocks are left if no bad blocks then the field is correct EXIT_CORRECTION else if bad blocks equal 1 do FIELD_SINGLE_BLOCK_ERASURE else if bad blocks equal 2 do FIELD_DOUBLE_BLOCK_ERASURE else if bad blocks greater than two field uncorrectable

FIELD_SINGLE_ERASURE generate syndromes in the Z direction for all bytes in the field, this produces two blocks of syndromes, these blocks of syndromes are stored in the field buffer RAM correct the single bad block by a byte at a time exclusive-or with field syndrome block 1, each byte in the bad block is exclusive-ored with the byte in the field syndrome block 1 that has the same row and column address, check bytes and aux bytes are excluded from this process do EXIT_CORRECTION

FIELD_DOUBLE_BLOCK_ERASURE generate syndromes in the Z direction for all bytes in the field using the two bad block addresses and field syndrome block 1 and 2 generate two error pattern correction bytes, the first error pattern correction byte is exclusive-ored with a byte from the first bad block and the second error pattern correction byte is exclusive ored with a byte from the second bad block, the row and column address of the byte in the first and second bad blocks is the same as the row and column address of the bytes read from the field syndrome blocks that were used to generate the error pattern correction bytes repeat until all bytes except check bytes and aux bytes have been exclusive-ored with the error pattern correction bytes do EXIT_CORRECTION

EXIT_CORRECTION wait for next field do BEGIN

In this application through FIG. 8, we have illustrated the operation of the invention with logic and block diagrams. Additionally and in the preceding portion of the specification, the pseudo code has been listed. This is a representation in plain language which tracks the error-correction protocol that we have disclosed herein. In order to enable complete practice of the invention, two additional pieces of information are included herein.

First, there is a block diagram in FIG. 9 of an error-correction code processor. Understanding that all paths are 8 bits wide and the reference numbers to the distances part numbers are LS74 series TTL generic numbers known and used in the industry, it will be seen that disc data enters on bus 500. The data is routed to RAM 650 via latch 652 and is stored at the location generated by address generator 654. Data from RAM is latched out at latch 660. A PROM resident at 664 is suitably addressed by a latch 663. An address latch 667 addresses a scratch pad memory 668.

In the process herein illustrated, we require the generation of 8 bit constant words. We use a byteconstant generator 669. These respective components communicate to an arithmetic logic unit (2901) 670. Data is thereafter processed through latch 672 and passed out at an 8-bit-wide bus to the system interface at 700.

The reader will recognize that the disclosed matter is in summary form. However, with the included pseudo-code, the microfiche appendix filed concurrently herewith together with the microword layout sheet of FIG. 12 the description is complete. Combining the complete listing of the program utilized to run the microprocessor 670 and the microword layout, a fully sufficient disclosure is included.

What is claimed is:

1. A memory for storing digital data, said memory being encoded with a two-dimensional data array having error-correction code therein, said data array comprising data intervals of multi-bit binary words, said words being written in rows and columns of sequential multi-bit binary words filling less than all of the data intervals of said array;

said memory for storing digital data including at least one data interval therein for at least one auxiliary check byte computed across said data array;

said memory for storing digital data further having a two-dimensional data array including at least first and second row-correcting columns having means for correcting errors across rows of data;

said memory for storing digital data further having a two-dimensional data array including at least first and second column-correcting rows having means for correcting errors acros columns of data;

said memory readable along said two dieminsions so that each row-correcting column and each column-correcting row including coded information for the location and correction of at least one error in a column and/or one error in a row whereby upon data regeneration by said columns and rows, said regenerated data can be used in the calculation of auxiliary check syndromes to indicate whether data has been accurately regenerated.

2. The memory of claim 1 and wherein said column correction rows and said row correcting columns of said memory extend at respective identical column and row addresses linearly across said memory.

3. The memory of claims 1 and wherein said memory for said data array includes within said field three auxiliary check bytes therein computed across the data field.

4. The memory of claim 1 wherein said memory including said two-dimensional array is combined with other correspondent two-dimensional arrays in said memory to form a three-dimensional array.

5. The apparatus of claim 1 wherein said memory is an optical disc.

6. The apparatus of claim 1 wherein said binary words are interleaved so that adjacent words in a database to be stored on said memory are physically separated on said memory.

7. A process for generating a two-dimensional array comprising the steps of:

placing serially multi-bit words to said two-dimensional array to less than all of the available data areas of said array;

computing over the entire field of said two-dimensional array at least one auxiliary check byte; and computing and placing in remaining portions two-dimensional array column checking rows and row checking columns whereby said two-dimensional array contains two-dimensional error correction for the regeneration of data.

8. The invention of claim 7 and wherein said computing and placing steps includes the step of generating Reed/Solomon code in said row correcting columns and column-correcting rows.

9. The invention of claim 7 and wherein said computing over the entire field step of said auxiliary check byte includes computing and placing at least three multi-bit binary words as auxiliary check bytes to said two-dimensional data arrays.

10. A memory for storing digital data, said memory being encoded with a three-dimensional data array for receiving an error-correction protocol, said memory for receiving said data array including:

a memory for receiving multi-bit binary words, said words being written in rows and columns to form successive two-dimensional data arrays, said memory at said two-dimensional data arrays being addressable sequentially to form the three-dimensional data array;

said memory at said two-dimensional data arrays including column-correcting rows and row-correction columns whereby each two-dimensional data array can be addressed for error correction along vectors in two dimensions;

said successive two-dimensional data arrays of said three-dimensional array in said memory including at least one two-dimensional redundant array in said memory; and said two-dimensional redundant array of said memory being disposed for individual error correction of discrete errors in the two-dimensional arrays of the three-dimensional array along correction vectors different than those provided by said row-correcting columns and said column-correcting rows of said two-dimensional data arrays.

11. The memory of claim 10 and wherein said column-correcting rows and said row-correcting columns certain Reed/Solomon code.

12. The memory of claim 10 and wherein said successive two-dimensional sata arrays of said three-dimensional data array in said memory include first and second two-dimensional redundant arrays.

13. The memory of claim 10 and wherein said correction vectors are orthogonal to one another along first, second and third directions through the memory.

14. The apparatus of claim 10 wherein said memory is an optical disc.

15. A process of generating a three-dimensional data array containing redundancy information comprising:

generating at least one two-dimensional data array having rows and columns by serially placing multi-bit binary words until said array contains data;

generating sequentially after said first two-dimensional data array a plurality of correspondent data arrays whereby successive two-dimensional data arrays are serially generated to form said three-dimensional data array;

generating for each two-dimensional data array a plurality of column-correcting rows and row-correcting columns whereby error in each of said two-dimensional data arrays is individually addressable along two error-correcting vectors within said two-dimensional data arrays to redundantly correct any single error; and generating across the two-dimensional arrays at least one two-dimensional redundant array, whereby redundancy data from said two-dimensional redundant arrays are individually addressable to error along dimensions across said two-dimensional data arrays.

16. The process of claim 15 and wherein said generating of at least one two-dimensional array with rows and columns by serially placing multi-bit binary words comprises generating said rows and columns until all of said rows and columns excepting two contain data.

17. The invention of claim 15 and wherein the steps of generating sequentially after said first two-dimensional data array a plurality of correspondent data arrays includes the step of generating sequentially two-dimensional data arrays.

18. The invention of claims 15 and wherein said generating steps include the step of generating Reed/Solomon code.

19. The process of claim 15 further comprising interleaving said binary words so that adjacent words in a database to be stored in said three-dimensional data array are separated in said three-dimensional data array.

20. A process of writing a two-dimensional data array comprising the steps of:

filling serially in said two-dimensional array data to an area of said array;

generating and filling row correcting columns for locating and correcting error in rows of said two-dimensional data array;

generating and filling column correcting rows for locating and correcting error in columns of said two-dimensional data array; whereby said two-dimensional array contains two-dimensional correction directions along said array; and serially writing to a memory media said rows and columns of said data array including said row correcting columns and said column correcting rows, said writing occurring from a sequence along directions differing from said error-correction whereby sequential errors on read back from said memory are individually addressable by differing data, including errors in said column-correcting rows and said row-correcting columns.

21. The invention of claim 20 and wherein said row-correcting columns and said column-correcting rows include Reed/Solomon code.

22. The invention of claim 20 and including the step of filling serially in sequential rows in said two-dimensional array to less than all of the available data areas of said arrays; and computing over the entire field of said two-dimensional array data at least one auxiliary check byte.

23. A process of generating a three-dimensional data array containing redundancy information comprising in combination:

generating a plurality of two-dimensional data arrays having rows and columns by serially placing multi-bit binary words to said data array;

generating for each two-dimensional data array a plurality of column correcting rows and row-correcting columns whereby error in each two-dimensional array is individually addressable along two error-correcting directions of first and second differing direction to redundantly correct any single error;

generating across the two-dimensional arrays of said three-dimensional array along a third dimension a plurality of two-dimensional redundant arrays, the third dimension of generation being different in direction from the two error-correcting directions of said two-dimensional data arrays whereby redundancy data from said two-dimensional data arrays are individually addressable to any single error across the third dimension to any of said two-dimensional arrays; and writing to a memory media from said three-dimensional array along a fourth direction of said three-dimensional array, said write causing sequential error on read back from said memory media to be addressable by differing error-correction code combinations from said column correcting rows, said row correcting columns and said two-dimensional redundant arrays.

24. The invention of claim 23 and wherein said two-dimensional redundant arrays are aligned in parallel planes in said three-dimensional array.

25. The invention of claim 23 and wherein said write to a memory media from said three-dimensional array moves sequentially through said two-dimensional data arrays with each serial multi-bit binary word.

26. The invention of claim 23 and wherein said write to a memory media from said three-dimensional array moves sequentially through said data arrays at each of differing row and column positions.

27. A process of reading from a memory media a two-dimensional array, said two-dimensional array having error-correction code therein, said two-dimensional data array comprising:

multi-bit binary words, said words being in rows and columns of sequential words filling less than all the data spaces of said array, said data array including at least one data interval therein for at least one auxiliary check byte computed across said data array and placed in said data interval;

said two-dimensional array including first and second row-correcting columns and first and second column-correcting rows for locating and correcting error across said respective rows and columns; and the process of reading said two-dimensional data array comprising the steps of:

computing across rows of said two-dimensional array to generate at least two columns of row syndromes, said syndromes having values to flag the presence of errors, computing across said columns to form at least two rows of column syndromes having values to flag the presence of error; and computing across said data array including said auxiliary check bytes syndromes to flag the presence of error.

28. The invention of claim 27 and including the steps of counting said row correction syndromes and said column correction syndromes and, starting correction in the row dimension or column dimension, whichever has the most values to flag the presence of error.

29. The invention of claim 27 and including the step of utilizing Reed/Solomon code to locate error and correct error along said rows and columns.

30. The invention of claim 29 and including the steps of iterating row and column correction.

31. The invention of claim 27 including computing and with each error correction step to update auxiliary check byte syndromes computed across said data field of said two-dimensional array.

32. The invention of claim 30 and wherein said iterating extends to three row and column iterations.

33. A process of reading from a memory media a three-dimensional data array for error-correction protocol incorporated therein, said data array including multi-bit binary words, said words being filled in rows and columns to form successive two-dimensional data arrays, said two-dimensional data arrays being addressable sequentially to form said three-dimensional data arrays;

each said two-dimensional data array including at least paired column correcting rows and at least paired row-correcting columns whereby each two-dimensional data array can be addressed for discrete error correction in two-dimensions, said successive two-dimensional arrays of said three-dimensional array including at least first and second two-dimensional redundant arrays, said two-dimensional redundant arrays being disposed for individual error correction of discrete errors across the two-dimensional arrays of said three-dimensional array along directions differing from those provided by said row correcting columns and said column correcting rows, said process of reading from a memory media comprising the steps of:

generating for one two-dimensional array at least two columns of syndromes, each syndrome addressed to a row of data, said syndrome having values for indicating error;

generating for one array at least two rows of syndromes having values for indicating the presence of error; and generating syndromes across said two-dimensional arrays including said two-dimensional redundant arrays whereby single error may be addressed parallel to first, second and third differing directions along said arrays.

34. The invention of claim 29 and wherein said generating step further includes locating said error and correcting said error.

35. The invention of claim 29 and including the step of applying error correction on less than all of said two-dimensional arrays of said three-dimensional array.

36. The invention of claim 29 and wherein said generating of syndromes across said two-dimensional array includes syndrome generation on less than all of said two-dimensional data arrays.

37. The invention of claim 29 and wherein said generating of syndromes across said two-dimensional array includes all of said two-dimensional data arrays.

38. The invention of claim 29 and wherein said generating of syndromes step includes locating two or less two-dimensional data arrays not correctable by the column correcting rows and the row correcting columns of said arrays and after location of said arrays correcting said arrays using the two-dimensional redundant arrays.

39. A process of generating a group of three-dimensional data arrays containing redundancy information comprising in combination:

generating a plurality of two-dimensional data arrays having rows and columns by serially filling data bits to said data array;

generating for each two-dimensional data array a plurality of column correcting rows and row-correcting columns whereby on read back error in each two-dimensional array is individually addressable along first and second directions to redundantly correct discrete error;

generating across the two-dimensional arrays of said three-dimensional arrays along a third direction a plurality of redundancy two-dimensional arrays, the third direction being different from the two error-correcting directions of said two-dimensional data arrays whereby on read back discrete errors from said two-dimensional data arrays are individually addressable to correct error through the dimension of said two-dimensional data arrays;

writing to a memory media from said three-dimensional arrays along a fourth direction through said three-dimensional array, said write causing on read back sequential discrete error to be addressable by differing error-correction codes from said column correcting rows, said row correcting columns and said two-dimensional redundant data arrays; and writing said redundant three-dimensional array to said memory media.

40. The invention of claim 39 and wherein said computing step includes the step of exclusively ORing.

41. The invention of claim 33 and including the steps of locating syndrome intersection for said one array and generating syndromes for error correction across said two-dimensional arrays and said two-dimensional redundant array only at the intersection of said row and column error syndromes of said two-dimensional array.

42. The invention of claim 40 and wherein said exclusive ORing step occurs during said writing to a memory media.

43. The invention of claim 39 and wherein said memory media includes a video format.

44. A computer and memory for receiving a three-dimensional data array and an error-correcting protocol, said memory for said array including:
memory for receiving multi-bit binary words, each of said words being written at the intersection of first, second and third addresses; and
said computer for processing each of said words to generate first, second and third error-correction computations independently addressable by said first, second and third address whereby any data point within said three-dimensional array is addressable by first, second and third error-corrections.

45. An error-correction protocol for reading a three-dimensional data array, said data array having a plurality of two-dimensional data arrays having rows and columns serially filled with multi-bit binary data words, at least one auxiliary check byte computed across said data words and plurality of column correcting rows and row correcting columns aligned to said two-dimensional data array; a collection of said data arrays forming said three-dimensional data array and having a plurality of two-dimensional redundant data arrays for correcting error across said two-dimensional data arrays; the process comprising the steps of: locating a two-dimensional data array to be decoded from within said three-dimensional array; generating for the located data array only respective column syndromes and row syndromes from said data and said column-correcting rows and row connecting columns, said syndromes having values to indicate presence of error; decoding said syndromes for error in the dimension of said two-dimensional array having the most values indicating the presence of error; thereafter decoding said syndromes for error in the remaining dimension of said two-dimensional array and if all said values indicating the presence of error are eliminated, generating an auxiliary check byte syndrome, said auxiliary syndrome having a value to indicate error.

46. The error-correction protocol of claim 45 and including the step of observing said two-dimensional data array during said decoding step for two rows and two or less columns with syndrome values indicating error; or two columns and two or less rows with syndrome values indicating error and performing a two erasure correction algorithm and repeating said generating an auxiliary check syndrome step.

47. The error-correction protocol of claim 45 comprising the steps of: observing said row and column syndrome values for indicating error and determining if there are precisely two rows and two or more columns with syndrome values indicating error or precisely two columns and two or more rows with syndrome values indicating error, utilizing these values to map possible locations of error; and then as to said mapped and possible locations of error performing a two erasure algorithm and repeating said step generating an auxiliary check byte syndrome.

48. The error-correction protocol of claim 47 and wherein said repeating said step generating an auxiliary check syndrome includes updating said auxiliary check syndrome as column and row corrections occur.

49. The error-correction protocol of claim 45 including performing iterations of said decoding for the located data array only until the number of iterations reaches three.

50. The error-correction protocol of claim 49 and including the step of observing said two-dimensional array after said third iteration and if only two rows and two or more columns or two columns and two or more rows with error-indicating syndrome values remain, performing a two erasure correction algorithm and repeating said step generating an auxiliary check syndrome.

51. The error-correction protocol of claim 50 including the steps of: if the step of generating an auxiliary check syndrome has a value indicating error, removing all changes to the data block and restoring said data block, and thereafter locating each site of possible error by observing check byte syndromes with error-indicating values to map possible error location and thereafter computing error-correction syndromes along vectors across said two-dimensional data arrays including said two-dimensional redundant arrays at said mapped sites only; decoding said error-correction syndromes to correct error; and, repeating said step generating an auxiliary syndrome step on said two-dimensional array.

52. The error-correction protocol of claim 51 and including the steps of: if the step of generating an auxiliary check syndrome has a value indicating error thereafter generating row and column syndromes for all of the two-dimensional arrays of said three-dimensional array; thereafter utilizing said generated syndromes to locate and correct error in said two-dimensional arrays of said three-dimensional array and performing said auxiliary check byte syndrome step on all of the said two-dimensional arrays and if after a predetermined number of iterations there are one or more two-dimensional arrays not successfully decoded then locating the error sites in said two-dimensional arrays that are not successfully decoded; generating syndromes across said data arrays at least at said located error sites including said two-dimensional redundant data arrays and utilizing said syndromes to locate and correct error and repeating said generating an auxiliary check syndrome step.

53. The error-correction protocol of claim 52 and including the steps of observing the auxiliary check syndromes for said two-dimensional data arrays and if only one or two syndromes have values in said three-dimensional data array, performing erasure correction on the two-dimensional arrays having an auxiliary check syndrome with value indicating errors and repeating said step of generating an auxiliary check syndrome.

54. The error-correction protocol of claim 53 and wherein only one two-dimensional array has auxiliary check syndrome with value indicating error and a single-erasure error correction is performed.

55. The error-correction protocol of claim 53 and wherein two-dimensional arrays have auxiliary check syndromes with value indicating error and a double-erasure error correction is performed.

56. The error-correction protocol of claim 53 and including if said auxiliary check syndrome has error-indicating value, then observing if there are more than two two-dimensional arrays not yet successfully decoded; and if said observation is true, rereading at least said two-dimensional arrays with auxiliary check syndromes having value indicating error of three-dimensional arrays and repeating the steps of claim 45.

57. The error-correction protocol of claim 53 and wherein said reread is done an odd number of times exceeding one and a majority vote is taken across all reads for each bit or byte.

58. An apparatus for reading from a memory media a two-dimensional array, said two-dimensional array having error-correction code therein, said two-dimensional array comprising multi-bit binary words, said words being in rows and columns of sequential words filling less than all the data spaces of said array, said array including at least one data interval therein for at least one auxiliary check byte computed across said data array and placed in said data interval, said two-dimensional array including first and second row-correcting columns and first and second column-correcting rows for locating and correcting errors across said respective rows and columns, said apparatus comprising:
  means for computing across rows of said two-dimensional array to generate at least two columns of row correction syndromes, said syndromes having values to flag the presence of errors;
  means for computing across said columns to form at least two rows of column correction syndromes having values to flag the presence of errors; and
  means for computing across said data array including said auxiliary check bytes syndromes to flag the presence of errors.

59. The apparatus of claim 58 further comprising means for counting said row correction syndromes and said column correction syndromes and starting correction in the row dimension or column dimension, whichever has the most values, to flag the presence of error.

60. The apparatus of claim 58 further comprising means for utilizing Reed/Solomon code to locate error and correct error along said rows and columns.

61. The apparatus of claim 60 further comprising means for iterating row and column correction.

62. The apparatus of claim 61 wherein said iterating extends to three row and column iterations.

63. The apparatus of claim 58 further comprising means for computing with each error correction step to update auxiliary check byte syndromes computed across said data field of said two-dimensional array.

64. The apparatus of claim 58 wherein said memory media ia an optical disc.

65. An apparatus for reading from memory media a three-dimensional data array for error-correction protocol incorporated therein, said data array including multi-bit binary words, said words being filled in rows and columns to form successive two-dimensional data arrays, said two-dimensional data arrays being addressable sequentially to form said three-dimensional data arrays;
  each said two-dimensional data array including at least paired column-correcting rows and at least paired row-correcting columns whereby each two-dimensional data array can be addressed for discrete error correction in two dimensions, said successive two-dimensional arrays of said three-dimensional array including at least first and second two-dimensional redundant arrays, said two-dimensional redundant arrays being disposed for individual error correction of discrete errors across the two-dimensional arrays of said three-dimensional array along directions differing from those provided by said row-correcting columns and said column-correcting rows, said apparatus comprising:
  means for generating for one two-dimensional array at least two columns of syndromes, each syndrome addressed to a row of data, said syndrome having values for indicating error;
  means for generating for one array at least two rows of syndromes having values for indicating the presence of error; and
  means for generating syndromes across said two-dimensional arrays including said two-dimensional redundant arrays whereby single error may be addressed parallel to first, second and third differing directions along said arrays.

66. The apparatus of claim 65 wherein said first generating means further includes means for locating said error and correcting said error.

67. The apparatus of claim 65 further comprising means for applying error correction on less than all of said two-dimensional arrays of said three-dimensional array.

68. The apparatus of claim 65 wherein said third generating means includes means for generating syndromes on less than all of said two-dimensional data arrays.

69. The apparatus of claim 65 wherein said third generating means includes means for generating syndromes on all of said two-dimensional data arrays.

70. The apparatus of claim 65 wherein said third generating means includes means for locating two or less two-dimensional data arrays not correctable by the column-correcting rows and the row-correcting columns of said arrays and, after location of said arrays, correcting said arrays using the two-dimensional redundant arrays.

71. A processor for decoding a data array comprising:
  temporary memory means for storing said data array;
  an arithmetic logic unit;
  a plurality of latches for storing memory addresses; and
  permanent memory means for storing a program adapted to control said temporary memory means, arithmetic logic unit and latches to decode a two-dimensional data array having error-correction code therein, said data array comprising data intervals of multi-bit binary words, said words being written in rows and columns of sequential multi-bit binary words filling less than all of the data intervals of said array;
  said data array including at least one data interval therein for at least one auxiliary check byte computed across the data array;
  said two-dimensional data array including at least first and second row-correcting columns having means for correcting errors across rows of data;
  said two-dimensional data array including at least first and second column-correcting rows having means for correcting errors across columns of data;
  each row-correcting column and each column-correcting row including coded information for the location and correction of at least one error in a column and/or one error in a row whereby upon data regeneration by said columns and rows, said regenerated data can be used in the calculation of auxiliary check syndromes to indicate whether data has been acurately regenerated.

72. The processor of claim 71 wherein said column-correcting rows and said row-correcting columns contain Reed/Solomon code.

73. The processor of claim 71 wherein said column-correcting rows and said row-correcting columns extend at respective identical column and row address linearly across said array.

74. The processor of claim 71 wherein said data array includes three auxiliary check bytes therein computed across the data array.

75. The processor of claim 71 wherein said two-dimensional array is combined with other correspondent two-dimensional arrays to form a three-dimensional array.

76. The processor of claim 71 wherein said row-correcting columns and said column-correcting rows can regenerate said auxiliary check bytes.

77. A processor for decoding a data array comprising:
temporary memory means for storing said data array;
an arithmetic logic unit;
a plurality of latches for storing memory addresses; and
permanent memory means for storing a program adapted to control said temporary memory means, arithmetic logic unit and latches to decode a three-dimensional data array with an error-correction protocol, said data array including multi-bit binary words, said words being written in rows and columns to form successive two-dimensional data arrays, said two-dimensional data arrays being addressable sequentially to form the three-dimensional data array;
said two-dimensional data arrays including column-correcting rows and row-correcting columns whereby each two-dimensional data array can be addressed for error correction along vectors in two dimensions;
said successive two-dimensional data arrays of said three-dimensional array including at least one two-dimensional redundant array; and
said two-dimensional redundant array being disposed for individual error correction of discrete errors in the two-dimensional arrays of the three-dimensional array along correction vectors different than those provided by said row-correcting columns and said column-correcting rows of said two-dimensional data arrays.

78. The processor of claim 77 wherein said column-correcting rows and said row-correcting columns contain Reed/Solomon code.

79. The processor of claim 77 wherein said successive two-dimensional data arrays of said three-dimensional data array include first and second two-dimensional redundant arrays.

80. The processor of claim 77 wherein said correction vectors are orthogonal to one another along first, second and third directions.

81. An apparatus for writing a two-dimensional data array to a memory comprising:
means for serially placing multi-bit binary words in said two-dimensional array data;
means for generating and filling row correcting columns for locating and correcting error in rows of said two-dimensional data array;
means for generating and filling column correcting rows for locating and correcting error in columns of said two-dimensional data array;
whereby said two-dimensional array contains two-dimensional correction directions along said array; and
means for serially writing to a memory media said rows and columns of said data array including said row-correcting columns and said column-correcting rows, said writing occurring from a sequence along directions differing from said error-correction whereby sequential errors on read back from said memory are individually addressable by differing data, including errors in said column-correcting rows and said row-correcting columns.

82. The invention of claim 81 wherein said row-correcting columns and said column-correcting rows include Reed/Solomon code.

83. The invention of claim 81 further comprising:
means for filling serially in sequential rows in said two-dimensional array to less than all of the available data areas of said arrays; and
means for computing over the entire field of said two-dimensional array data at least one auxiliary check byte.

84. An apparatus for writing a three-dimensional array containing redundancy information to a memory media comprising in combination:
means for generating a plurality of two-dimensional data arrays having rows and columns by serially placing multi-bit binary words to said data array;
means for generating for each two-dimensional data array a plurality of column-correcting rows and row-correcting columns whereby error in each two-dimensional array is individually addressable along two error-correcting directions of first and second differing directions to redundantly correct any single error;
means for generating across the two-dimensional arrays of said three-dimensional array along a third dimension of plurality of two-dimensional redundant arrays, the third dimension of generation being different in direction from the two error-correcting directions of said two-dimensional data arrays whereby redundancy data from said two-dimensional data arrays are individually addressable to any single error across the third dimension to any of said two-dimensional arrays; and
means for writing to a memory media from said three-dimensional array along a fourth direction of said three-dimensional array, said write causing sequential error on read back from said memory media to be addressable by differing error-correction code combinations from said column-correcting rows, said row-correcting columns and said two-dimensional redundant arrays.

85. The invention of claim 84 wherein said two-dimensional redundant arrays are aligned in parallel planes in said three-dimensional array.

86. The invention of claim 84 wherein said means for writing to a memory media from said three-dimensional array moves sequentially through said two-dimensional data arrays with each serial multi-bit binary word.

* * * * *